US012631227B2

(12) United States Patent
Nakajima

(10) Patent No.: US 12,631,227 B2
(45) Date of Patent: May 19, 2026

(54) CALIPER ADAPTOR AND DISC BRAKE CALIPER FOR HUMAN-POWERED VEHICLE

(71) Applicant: SHIMANO INC., Sakai City (JP)

(72) Inventor: Takehiko Nakajima, Sakai City (JP)

(73) Assignee: SHIMANO INC., Sakai (JP)

( * ) Notice: Subject to any disclaimer, the term of this patent is extended or adjusted under 35 U.S.C. 154(b) by 769 days.

(21) Appl. No.: 18/073,450

(22) Filed: Dec. 1, 2022

(65) Prior Publication Data

US 2024/0183413 A1     Jun. 6, 2024

(51) Int. Cl.
| | |
|---|---|
| *F16D 65/00* | (2006.01) |
| *B62L 1/00* | (2006.01) |
| *F16D 65/18* | (2006.01) |
| *F16D 55/00* | (2006.01) |
| *F16D 121/04* | (2012.01) |

(52) U.S. Cl.
CPC .......... *F16D 65/0056* (2013.01); *B62L 1/005* (2013.01); *F16D 65/0075* (2013.01); *F16D 65/18* (2013.01); *F16D 2055/0008* (2013.01); *F16D 2055/002* (2013.01); *F16D 2121/04* (2013.01)

(58) Field of Classification Search
CPC .. F16D 65/0056; F16D 65/0075; F16D 65/18; F16D 2055/0008; F16D 2055/002; F16D 2121/04

USPC ......................................................... 188/72.4
See application file for complete search history.

(56) References Cited

U.S. PATENT DOCUMENTS

| | | | | |
|---|---|---|---|---|
| 9,551,389 | B2 * | 1/2017 | Hirotomi | ................ F16D 65/18 |
| 11,926,390 | B2 * | 3/2024 | Dunlap | ................... B62K 19/38 |
| 2020/0292018 | A1 * | 9/2020 | Ishizaki | .............. F16D 65/0075 |
| 2022/0194513 | A1 | 6/2022 | Heyna et al. | |
| 2023/0166807 | A1 * | 6/2023 | Heyna | .................... B62K 19/38 |
| 2024/0182133 | A1 * | 6/2024 | Mitsuyasu | .............. B62L 1/005 |

FOREIGN PATENT DOCUMENTS

WO     WO2013/031918     3/2013

* cited by examiner

*Primary Examiner* — Christopher P Schwartz
(74) *Attorney, Agent, or Firm* — MORI & WARD, LLP

(57) ABSTRACT

A caliper adaptor comprises a frame coupling portion, a first coupling portion, and a second coupling portion. The first coupling portion is configured to be coupled to a first caliper body of the disc brake caliper in a first state where the first caliper body is in a first radial position relative to the rotational axis. The first coupling portion extends in the axial direction in the first state. The second coupling portion is configured to be coupled to a second caliper body in a second state where the second caliper body is in a second radial position relative to the rotational axis. The second radial position is different from the first radial position. The second coupling portion extends in the axial direction in the second state.

30 Claims, 28 Drawing Sheets

CALIPER ADAPTOR AND DISC BRAKE CALIPER FOR HUMAN-POWERED VEHICLE

BACKGROUND

Technical Field

The present invention relates to a caliper adaptor and a disc brake caliper for a human-powered vehicle.

Background Information

A human-powered vehicle includes a disc brake rotor and a disc brake caliper. The disc brake caliper is arranged in a position corresponding to an outer radius of the disc brake rotor. Disc brake rotors having different outer radii may be mounted to a vehicle body of the human-powered vehicle. A mounting position of the disc brake caliper varies relative to the vehicle body depending on the outer radius of the disc brake rotor. Thus, it tends to increase kinds of disc brake calipers, increasing manufacturing costs of the disc brake calipers. One of objects of the present disclosure is to improve usability of a disc brake caliper while saving a manufacturing cost of the disc brake caliper.

SUMMARY

In accordance with a first aspect of the present invention, a caliper adaptor for a disc brake caliper of a human-powered vehicle comprises a frame coupling portion, a first coupling portion, and a second coupling portion. The frame coupling portion is configured to be mounted to a mounting portion of a vehicle body of the human-powered vehicle. The frame coupling portion extends in an axial direction in a coupling state where the mounting portion is mounted to the frame coupling portion. The axial direction is defined along a rotational axis of a disc brake rotor rotatably coupled to the vehicle body. The first coupling portion is configured to be coupled to a first caliper body of the disc brake caliper in a first state where the first caliper body is in a first radial position relative to the rotational axis. The first coupling portion extends in the axial direction in the first state. The second coupling portion is configured to be coupled to a second caliper body in a second state where the second caliper body is in a second radial position relative to the rotational axis. The second radial position is different from the first radial position. The second coupling portion extends in the axial direction in the second state.

With the caliper adaptor according to the first aspect, the frame coupling portion, the first coupling portion, and the second coupling portion enable the user to couple the vehicle body and each of the first caliper body and the second caliper body with a comparative simple structure. Thus, it is possible to apply the caliper adaptor to different radial positions of at least one disc brake caliper. Accordingly, it is possible to improve usability of the disc brake caliper while saving a manufacturing cost of the disc brake caliper.

In accordance with a second aspect of the present invention, the caliper adaptor according to the first aspect is configured so that the frame coupling portion includes a frame coupling hole in which a protruding portion of the mounting portion is to be at least partially provided. The frame coupling hole extends in the axial direction in a coupling state where the protruding portion is at least partially provided in the frame coupling hole.

With the caliper adaptor according to the second aspect, it is possible to couple the frame coupling portion and the vehicle body with a comparatively simple structure. Thus, it is possible to reliably improve usability of the disc brake caliper while saving the manufacturing cost of the disc brake caliper.

In accordance with a third aspect of the present invention, the caliper adaptor according to the first or second aspect is configured so that the first coupling portion includes a first hole extending in the axial direction in the first state. The first coupling portion is configured to be coupled to the first caliper body in the first state via the first hole.

With the caliper adaptor according to the third aspect, it is possible to couple the first coupling portion and the first caliper body with a comparatively simple structure. Thus, it is possible to reliably improve usability of the disc brake caliper while saving the manufacturing cost of the disc brake caliper.

In accordance with a fourth aspect of the present invention, the caliper adaptor according to the third aspect is configured so that the second coupling portion includes a second hole extending in the axial direction in the second state. The second coupling portion is configured to be coupled to the second caliper body in the second state via the second hole.

With the caliper adaptor according to the fourth aspect, it is possible to couple the second coupling portion and the second caliper body with a comparatively simple structure. Thus, it is possible to reliably improve usability of the disc brake caliper while saving the manufacturing cost of the disc brake caliper.

In accordance with a fifth aspect of the present invention, the caliper adaptor according to the fourth aspect is configured so that the first hole and the second hole constitute a single hole.

With the caliper adaptor according to the fifth aspect, it is possible to simplify the structure of the caliper adaptor. Thus, it is possible to improve usability of the disc brake caliper while reliably saving the manufacturing cost of the disc brake caliper.

In accordance with a sixth aspect of the present invention, the caliper adaptor according to the fourth or fifth aspect is configured so that the first coupling portion includes a first additional hole extending in the axial direction in the first state. The first additional hole is spaced apart from the first hole. The first coupling portion is configured to be coupled to the first caliper body in the first state via the first hole and the first additional hole.

With the caliper adaptor according to the sixth aspect, it is possible to stably couple the first caliper body and the vehicle body via the first hole and the first additional hole.

In accordance with a seventh aspect of the present invention, the caliper adaptor according to the sixth aspect is configured so that the second coupling portion includes a second additional hole extending in the axial direction in the second state. The second additional hole is spaced apart from the second hole. The second coupling portion is configured to be coupled to the second caliper body in the second state via the second hole and the second additional hole.

With the caliper adaptor according to the seventh aspect, it is possible to stably couple the second caliper body and the vehicle body via the second hole and the second additional hole.

In accordance with an eighth aspect of the present invention, the caliper adaptor according to the seventh aspect is configured so that the first hole has a first center axis. The first additional hole has a first additional center axis. The second hole has a second center axis. The second additional hole has a second additional center axis. A first distance is defined between the first center axis and the first additional center axis as viewed along the first center axis. A second distance is defined between the second center axis and the second additional center axis as viewed along the second center axis. The first distance is equal to the second distance.

With the caliper adaptor according to the eighth aspect, since the first distance is equal to the second distance, a structure of the first caliper body to which the first coupling portion of the caliper adaptor is coupled can be identical to a structure of the second caliper body to which the second coupling portion of the caliper adaptor is coupled. Thus, it is possible to use a common structure for the first caliper body and the second caliper body. Accordingly, it is possible to improve usability of the disc brake caliper while saving the manufacturing cost of the first caliper body and the second caliper body.

In accordance with a ninth aspect of the present invention, the caliper adaptor according to the eighth aspect is configured so that the frame coupling portion includes a frame coupling hole having a frame-coupling center axis. A first additional distance is defined between the first center axis and the frame-coupling center axis. A second additional distance is defined between the second center axis and the frame-coupling center axis. The first additional distance is equal to the second additional distance.

With the caliper adaptor according to the ninth aspect, it is possible to reliably use a common structure for the first caliper body and the second caliper body. Accordingly, it is possible to improve usability of the disc brake caliper while saving the manufacturing cost of the first caliper body and the second caliper body.

In accordance with a tenth aspect of the present invention, the caliper adaptor according to the ninth aspect is configured so that the first distance is shorter than the first additional distance.

With the caliper adaptor according to the tenth aspect, it is possible to make the first coupling portion comparatively compact. Thus, it is possible to improve usability of the disc brake caliper while saving the manufacturing cost of the first caliper body and the second caliper body.

In accordance with an eleventh aspect of the present invention, the caliper adaptor according to the ninth or tenth aspect is configured so that the second distance is shorter than the second additional distance.

With the caliper adaptor according to the eleventh aspect, it is possible to reduce make the second coupling portion comparatively compact. Thus, it is possible to improve usability of the disc brake caliper while saving the manufacturing cost of the first caliper body and the second caliper body.

In accordance with a twelfth aspect of the present invention, the caliper adaptor according to any one of the first to eleventh aspects further comprises a third coupling portion configured to be coupled to a third caliper body in a third state where the third caliper body is in a third radial position relative to the rotational axis. The third radial position is different from each of the first radial position and the second radial position.

With the caliper adaptor according to the twelfth aspect, the frame coupling portion, the first coupling portion, the second coupling portion, and the third caliper body enable the user to couple the vehicle body and each of the first caliper body, the second caliper body, and the third caliper body. Thus, it is possible to reliably improve usability of the disc brake caliper while saving the manufacturing cost of the first caliper body and the second caliper body.

In accordance with a thirteenth aspect of the present invention, the caliper adaptor according to the twelfth aspect is configured so that the first coupling portion includes a first hole extending in the axial direction in the first state. The first coupling portion is configured to be coupled to the first caliper body in the first state via the first hole. The second coupling portion includes a second hole extending in the axial direction in the second state. The second coupling portion is configured to be coupled to the second caliper body in the second state via the second hole. The third coupling portion includes a third hole extending in the axial direction in the third state. The third coupling portion is configured to be coupled to the third caliper body in the third state via the third hole.

With the caliper adaptor according to the thirteenth aspect, it is possible to couple the first coupling portion and the first caliper body with a comparatively simple structure, to couple the second coupling portion and the second caliper body with a comparatively simple structure, and to couple the third coupling portion and the third caliper body with a comparatively simple structure. Thus, it is possible to reliably improve usability of the disc brake caliper while saving the manufacturing cost of the first caliper body, the second caliper body, and the third caliper body.

In accordance with a fourteenth aspect of the present invention, the caliper adaptor according to the thirteenth aspect is configured so that the second coupling portion includes a second additional hole extending in the axial direction in the second state, the second additional hole being spaced apart from the second hole. The second coupling portion is configured to be coupled to the second caliper body in the second state via the second hole and the second additional hole. The second additional hole and the third hole constitute a single hole.

With the caliper adaptor according to the fourteenth aspect, it is possible to stably couple the second caliper body and the vehicle body via the second hole and the second additional hole while simplifying the structure of the caliper adaptor. Thus, it is possible to improve usability of the disc brake caliper while saving the manufacturing cost of the disc brake caliper.

In accordance with a fifteenth aspect of the present invention, the caliper adaptor according to the thirteenth or fourteenth aspect is configured so that the third coupling portion includes a third additional hole extending in the axial direction in the third state. The third additional hole is spaced apart from the third hole. The third coupling portion is configured to be coupled to the third caliper body in the third state via the third hole and the third additional hole.

With the caliper adaptor according to the fourteenth aspect, it is possible to stably couple the third caliper body and the vehicle body via the third coupling portion.

In accordance with a sixteenth aspect of the present invention, the caliper adaptor according to the fifteenth aspect is configured so that the frame coupling portion includes a frame coupling hole having a frame-coupling center axis. The first hole has a first center axis. The first additional hole has a first additional center axis. The second hole has a second center axis. The second additional hole has a second additional center axis. The third hole has a third center axis. The third additional hole has a third additional center axis. A first distance is defined between the first center axis and the first additional center axis as viewed along the first center axis. A second distance is defined between the second center axis and the second additional center axis as viewed along the second center axis. A third distance is defined between the third center axis and the third additional center axis. The third distance is equal to at least one of the first distance and the second distance.

With the caliper adaptor according to the sixteenth aspect, it is possible to couple the first caliper body and the vehicle body via the first hole and the first additional hole, to couple the second caliper body and the vehicle body via the second hole and the second additional hole, and to couple the third caliper body and the vehicle body via the third hole and the third additional hole. Since the third distance is equal to at least one of the first distance and the second distance, a structure of the third caliper body to which the caliper adaptor is coupled can be identical to at least one of the structure of the first caliper body to which the caliper adaptor is coupled and the structure of the second caliper body to which the caliper adaptor is coupled. Accordingly, it is possible to improve usability of the disc brake caliper while saving the manufacturing cost of the first caliper body and the second caliper body.

In accordance with a seventeenth aspect of the present invention, the caliper adaptor according to any one of the first to sixteenth aspects further comprises a first surface. The first surface faces in a first direction in a first coupling state where the frame coupling portion is coupled to the protruding portion and where the first coupling portion is coupled to the first caliper body. The first surface faces in a second direction in a second coupling state where the frame coupling portion is coupled to the protruding portion and where the second coupling portion is coupled to the second caliper body. The second direction is an opposite direction of the first direction.

With the caliper adaptor according to the seventeenth aspect, it is possible to turn the caliper adaptor over to use the caliper adaptor in each of the first coupling state and the second coupling state. Thus, it is possible to improve design flexibility of the first coupling portion and the second coupling portion.

In accordance with an eighteenth aspect of the present invention, the caliper adaptor according to any one of the first to sixteenth aspects further comprises a first surface and a third coupling portion. The third coupling portion is configured to be coupled to a third caliper body in a third state where the third caliper body is in a third radial position relative to the rotational axis. The third radial position is different from each of the first radial position and the second radial position. The first surface faces in a first direction in a first coupling state where the frame coupling portion is coupled to the protruding portion and where the first coupling portion is coupled to the first caliper body. The first surface faces in one of the first direction and a second direction in a second coupling state where the frame coupling portion is coupled to the protruding portion and where the second coupling portion is coupled to the second caliper body. The second direction is an opposite direction of the first direction. The first surface faces in one of the first direction and the second direction in a third coupling state where the frame coupling portion is coupled to the protruding portion and where the third coupling portion is coupled to the third caliper body.

With the caliper adaptor according to the eighteenth aspect, the frame coupling portion, the first coupling portion, the second coupling portion, and the third caliper body enable the user to couple the vehicle body and each of the first caliper body, the second caliper body, and the third caliper body. Furthermore, it is possible to turn the caliper adaptor over to use the caliper adaptor in each of the first coupling state and the second coupling state. Thus, it is possible to reliably improve usability of the disc brake caliper while improving design flexibility of the first coupling portion, the second coupling portion, and the third coupling portion.

In accordance with a nineteenth aspect of the present invention, the caliper adaptor according to the eighteenth aspect is configured so that the first surface faces in the first direction in the second coupling state. The first surface faces in the second direction in the third coupling state.

With the caliper adaptor according to the nineteenth aspect, it is possible to turn the caliper adaptor over to use the caliper adaptor in each of the first coupling state, the second coupling state, and the third coupling state. Thus, it is possible to reliably improve usability of the disc brake caliper while saving the manufacturing cost of the disc brake caliper.

In accordance with a twentieth aspect of the present invention, the caliper adaptor according to any one of the eleventh to nineteenth aspects is configured so that the third coupling portion is provided radially outwardly of the frame coupling portion in a third coupling state where the frame coupling portion is coupled to the protruding portion and where the third coupling portion is coupled to the third caliper body.

With the caliper adaptor according to the twentieth aspect, it is possible to apply the caliper adaptor to the third caliper body corresponding to a larger disc brake rotor. Thus, it is possible to reliably improve usability of the disc brake caliper while saving the manufacturing cost of the disc brake caliper.

In accordance with a twenty-first aspect of the present invention, the caliper adaptor according to any one of the first to twentieth aspects further comprises a sleeve provided in the frame coupling hole. The sleeve is made of a non-metallic material.

With the caliper adaptor according to the twenty-first aspect, the sleeve can reduce impact transmitted between the frame coupling portion and the mounting portion of the vehicle body, absorb dimension error of at least one of the frame coupling portion and the mounting portion of the vehicle body, and/or reduce wear of at least one of the frame coupling portion and the mounting portion of the vehicle body.

In accordance with a twenty-second aspect of the present invention, the caliper adaptor according to the twenty-first aspect is configured so that the sleeve is made of a resin material.

With the caliper adaptor according to the twenty-second aspect, it is possible to enhance effect of the sleeve.

In accordance with a twenty-third aspect of the present invention, a disc brake caliper for a human-powered vehicle comprises a first caliper body, a first brake pad, a second brake pad, and the caliper adaptor according to any one of the first to twenty-second aspects. The first caliper body includes a first body part and a second body part. The first brake pad is coupled to the first body part. The second brake pad is movable relative to the second body part.

With the disc brake caliper according to the twenty-third aspect, it is possible to improve usability of the disc brake caliper using the caliper adaptor.

In accordance with a twenty-fourth aspect of the present invention, the disc brake caliper according to the twenty-third aspect is configured so that the caliper adaptor is at least partially provided between the first body part and the second body part.

With the disc brake caliper according to the twenty-fourth aspect, it is possible to reliably couple the caliper adaptor and the first caliper body.

In accordance with a twenty-fifth aspect of the present invention, the disc brake caliper according to the twenty-third or twenty-fourth aspect is configured so that the first caliper body includes a first caliper coupling portion having a first pattern. The second caliper body includes a second caliper coupling portion having a second pattern. The first pattern is identical to the second pattern. The first coupling portion of the caliper adaptor is configured to be coupled to the first caliper coupling portion in the first state. The second coupling portion of the caliper adaptor is configured to be coupled to the second caliper coupling portion in the second state.

With the disc brake caliper according to the twenty-fifth aspect, it is possible to simplify the structure of the caliper adaptor, the first caliper body, and the second caliper body. Thus, it is possible to improve usability of the disc brake caliper while saving the manufacturing cost of at least one of the caliper adaptor, the first caliper body, and the second caliper body.

In accordance with a twenty-sixth aspect of the present invention, the disc brake caliper according to the twenty-fifth aspect is configured so that the first caliper coupling portion includes a first caliper coupling hole and a second caliper coupling hole. The first caliper coupling hole and the second caliper coupling hole define the first pattern. The second caliper coupling portion includes a third caliper coupling hole and a fourth caliper coupling hole. The third caliper coupling hole and the fourth caliper coupling hole define the second pattern. The first coupling portion of the caliper adaptor is configured to be coupled to the first caliper coupling hole and the second caliper coupling hole in the first state. The second coupling portion of the caliper adaptor is configured to be coupled to the third caliper coupling hole and the fourth caliper coupling hole in the second state.

With the disc brake caliper according to the twenty-sixth aspect, it is possible to stably couple the first caliper body and the vehicle body via the first coupling portion and to stably couple the second caliper body and the vehicle body via the second coupling portion.

In accordance with a twenty-seventh aspect of the present invention, the disc brake caliper according to any one of the twenty-third to twenty-sixth aspects further comprises a piston. The first caliper body includes a cylinder hole. The piston is movably provided in the cylinder hole.

With the disc brake caliper according to the twenty-seventh aspect, it is possible to apply the caliper adaptor to a hydraulic brake caliper.

In accordance with a twenty-eighth aspect of the present invention, the disc brake caliper according to the twenty-seventh aspect further comprises a magnetic body coupled to the piston.

With the disc brake caliper according to the twenty-eighth aspect, it is possible to magnetically attract one of the first brake pad and the second brake pad. Thus, it is possible to synchronize the movement of the first brake pad and the piston, smoothening the operation of the disc brake caliper.

In accordance with a twenty-ninth aspect of the present invention, the disc brake caliper according to any one of the twenty-third to twenty-eighth aspects further comprises an axle mounting bracket configured to couple the first caliper body and a hub axle of a hub assembly of the human-powered vehicle.

With the disc brake caliper according to the twenty-ninth aspect, it is possible to stably couple the first caliper body and the hub assembly.

In accordance with a thirtieth aspect of the present invention, the disc brake caliper according to the twenty-ninth aspect is configured so that the axle mounting bracket is integrally provided with the first body part as a one-piece unitary member.

With the disc brake caliper according to the thirtieth aspect, it is possible to simplify the structure of the first caliper body and the axle mounting bracket. Thus, it is possible to improve usability of the disc brake caliper while saving the manufacturing cost of the disc brake caliper.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
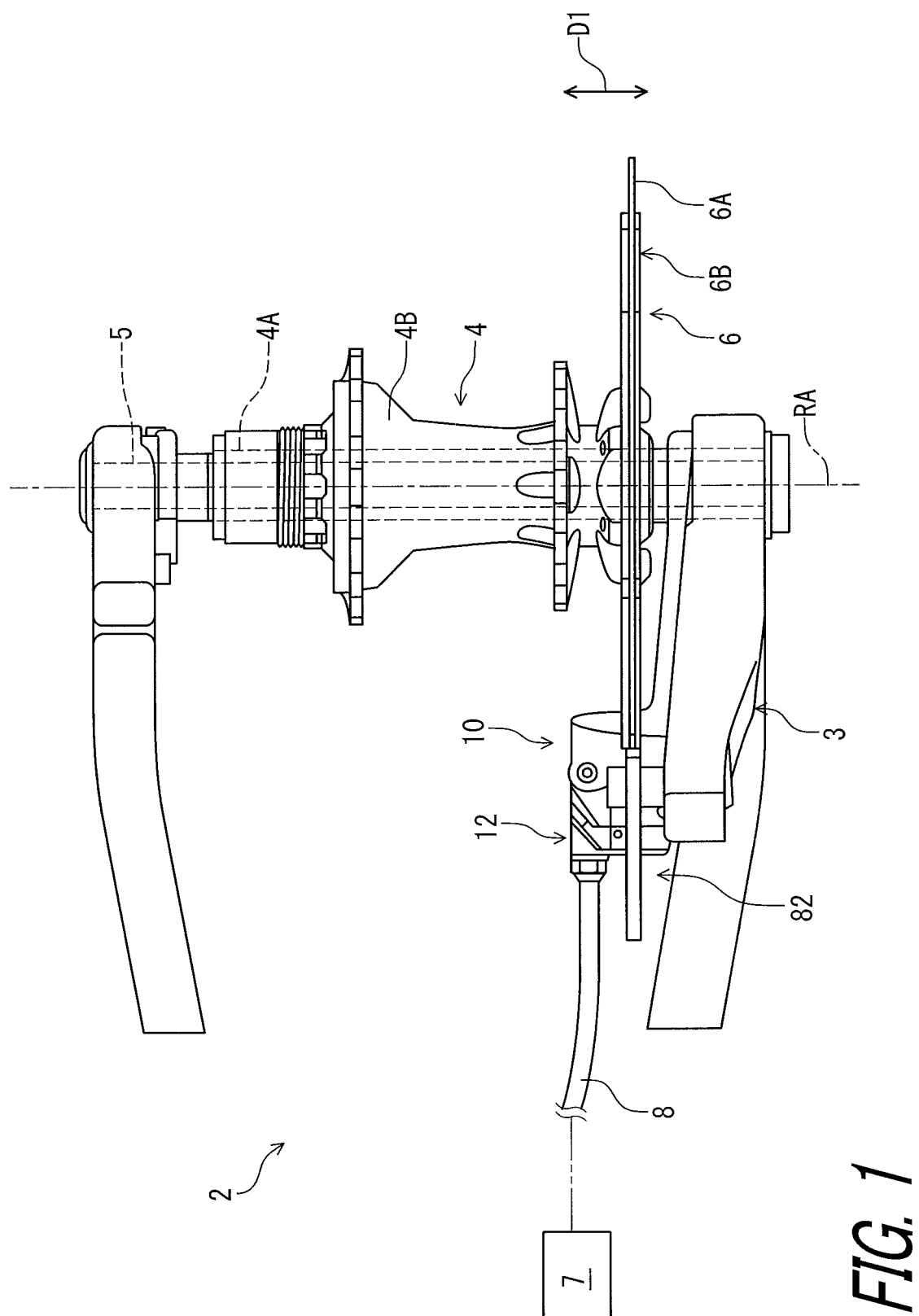
FIG. 1 is a partial plan view of a human-powered vehicle including a first disc brake caliper in accordance with a first embodiment.

The embodiments will now be described with reference to the accompanying drawings, wherein like reference numerals designate corresponding or identical elements throughout the various drawings.

First Embodiment

As seen in FIG. 1, a human-powered vehicle 2 includes a disc brake caliper 10 in accordance with one of embodiments. The human-powered vehicle 2 includes a vehicle body 3, a hub assembly 4, a hub coupling structure 5, and a disc brake rotor 6. The hub assembly 4 is coupled to the vehicle body 3 via the hub coupling structure 5. The hub assembly 4 includes a hub axle 4A and a hub body 4B. The hub axle 4A is coupled to the vehicle body 3 via the hub coupling structure 5.

Figure 2:
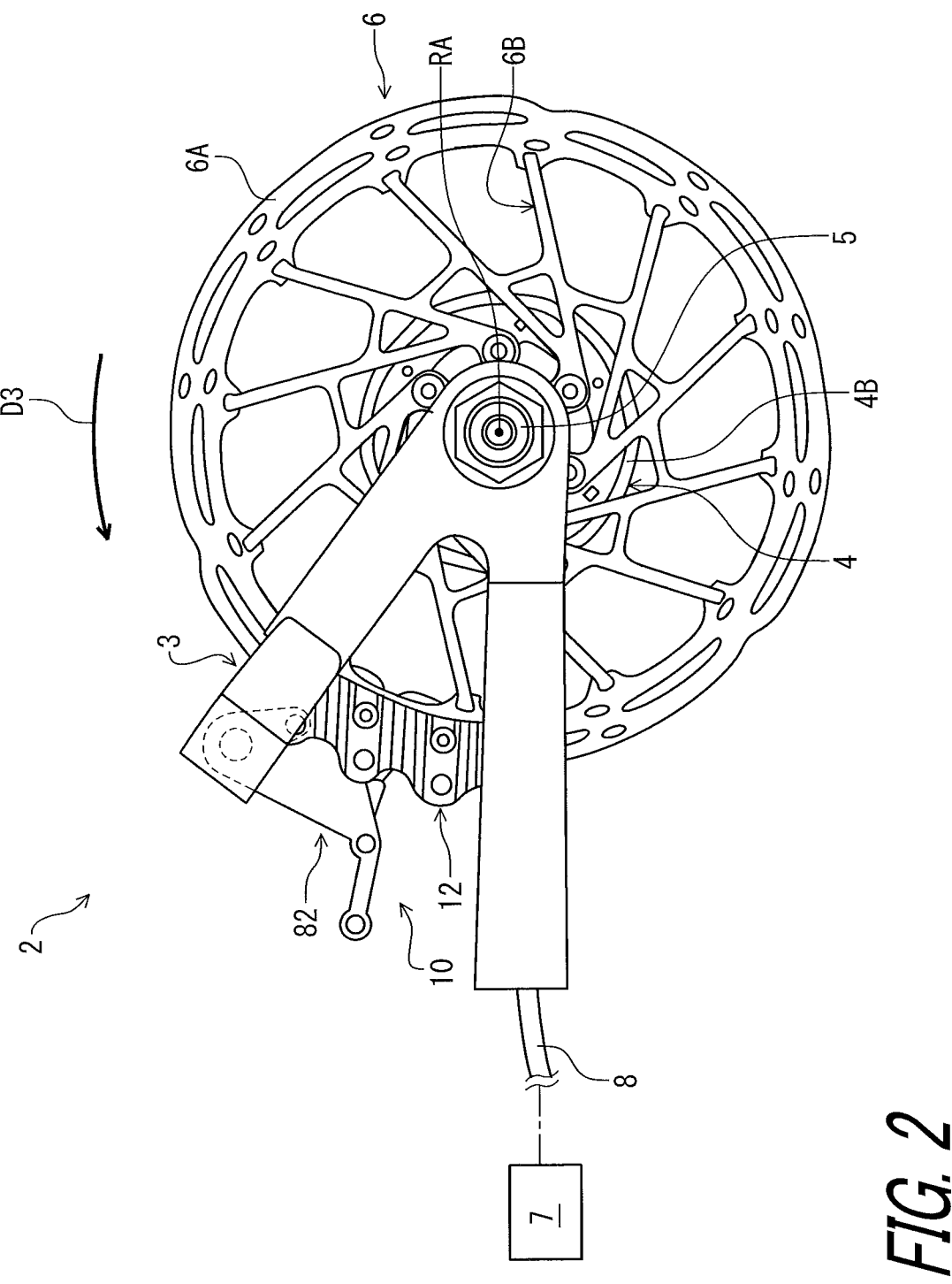
FIG. 2 is a partial side elevational view of the human-powered vehicle illustrated in FIG. 1.

As seen in FIG. 2, the hub body 4B is rotatably supported by the hub axle 4A about a rotational axis RA. The disc brake rotor 6 is rotatably coupled to the vehicle body 3 about the rotational axis RA. The disc brake rotor 6 is secured to the hub body 4B of the hub assembly 4. The disc brake rotor 6 rotates relative to the vehicle body 3 about the rotational axis RA in a driving rotational direction D3 during pedaling.

The disc brake rotor 6 includes a friction body 6A and a rotor support 6B. The friction body 6A has an annular shape. The friction body 6A is coupled to the rotor support 6B to rotate along with the rotor support 6B about the rotational axis RA. The rotor support 6B is secured to the hub body 4B of the hub assembly 4 with fasteners such as screws. The friction body 6A is movably coupled to the rotor support 6B in an axial direction D1 (see e.g., FIG. 1). The friction body 6A is movable relative to the rotor support 6B in the axial direction D1 (see e.g., FIG. 1). The axial direction D1 is defined along the rotational axis RA of the disc brake rotor 6 rotatably coupled to the vehicle body 3.

The disc brake caliper 10 is coupled to the vehicle body 3. The disc brake caliper 10 is configured to apply a braking force to the disc brake rotor 6. The disc brake caliper 10 is connected to an operating device 7 via a hydraulic hose 8. The disc brake rotor 6 can be referred to a first disc brake rotor 6. The disc brake caliper 10 can also be referred to as a first disc brake caliper 10.

In the present application, the term "human-powered vehicle" includes a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the disc brake caliper 10 or other components, should be interpreted relative to the human-powered vehicle 2 equipped with the disc brake caliper 10 or other components as used in an upright riding position on a horizontal surface.

In the present embodiment, the disc brake caliper 10 includes a rear disc brake caliper. However, the structure of the disc brake caliper 10 can be applied to a front disc brake caliper if needed and/or desired.

Figure 3:
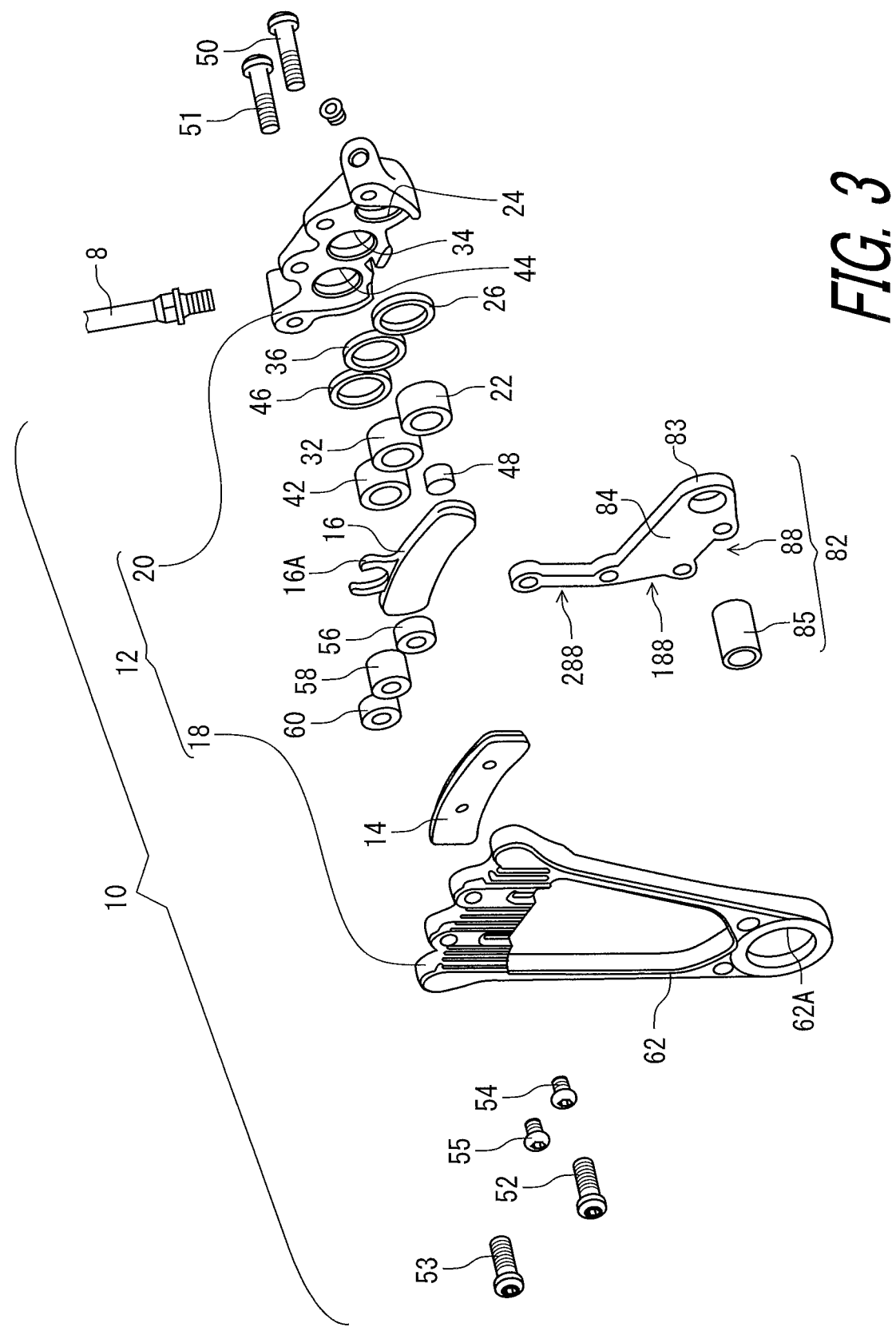
FIG. 3 is an exploded perspective view of the first disc brake caliper illustrated in FIG. 1.

As seen in FIG. 3, the disc brake caliper 10 for the human-powered vehicle 2 comprises a caliper body 12, a first brake pad 14, and a second brake pad 16. The caliper body 12 includes a first body part 18 and a second body part 20. The first brake pad 14 is coupled to the first body part 18. The second brake pad 16 is movable relative to the second body part 20.

In the present embodiment, the first brake pad 14 is secured to the first body part 18. The first brake pad 14 is separate member from the first body part 18. The first body part 18 is a separate member from the second body part 20. However, the first body part 18 can be integrally provided with the second body part 20 as a one-piece unitary member if needed and/or desired. The first brake pad 14 can be integrally provided with the first body part 18 as a one-piece unitary member if needed and/or desired. The caliper body 12 can also be referred to as a first caliper body 12.

The disc brake caliper 10 further comprises a piston 22. The first caliper body 12 includes a cylinder hole 24. The second body part 20 includes the cylinder hole 24. The piston 22 is movably provided in the cylinder hole 24. The disc brake caliper 10 further comprises a seal member 26. The seal member 26 is provided between the second body part 20 and the piston 22.

The disc brake caliper 10 further comprises a piston 32. The first caliper body 12 includes a cylinder hole 34. The second body part 20 includes the cylinder hole 34. The piston 32 is movably provided in the cylinder hole 34. The disc brake caliper 10 further comprises a seal member 36. The seal member 36 is provided between the second body part 20 and the piston 32.

The disc brake caliper 10 further comprises a piston 42. The first caliper body 12 includes a cylinder hole 44. The second body part 20 includes the cylinder hole 44. The piston 42 is movably provided in the cylinder hole 44. The disc brake caliper 10 further comprises a seal member 46. The seal member 46 is provided between the second body part 20 and the piston 42.

In the present embodiment, the disc brake caliper 10 includes the pistons 22, 32, and 42 and the seal member 26, 36, and 46. The first caliper body 12 includes the cylinder holes 24, 34, and 44. However, the disc brake caliper 10 can include at least one piston if needed and/or desired. The first caliper body 12 can include at least one cylinder hole if needed and/or desired. The disc brake caliper 10 can include at least one seal member if needed and/or desired.

The disc brake caliper 10 further comprises a magnetic body 48 coupled to the piston 22. The magnetic body 48 includes a magnet. The magnetic body 48 is secured to the piston 22 with a securing structure such as an adhesive, press-fitting, and insertion molding. The second brake pad 16 includes a magnetic material. The second brake pad 16 is magnetically attracted toward the magnetic body 48 to be moved along with the piston 22. The magnetic body 48 can be coupled to at least one of the pistons 22, 32, and 42 if needed and/or desired. In such modifications, the disc brake caliper 10 includes at least two magnetic body 48.

The disc brake caliper 10 comprises first fasteners 50 and 51, second fasteners 52 and 53, third fasteners 54 and 55, a first spacer 56, a second spacer 58, and a third spacer 60. The first body part 20 is secured to the second body part 20 with the first fasteners 50 and 51. The first body part 18 is secured to the second body part 20 with the second fasteners 52 and 53. Examples of each of the first fasteners 50 and 51, the second fasteners 52 and 53, and the third fasteners 54 and 55 include a screw, a rivet, and a combination of a bolt and a nut.

The first brake pad 14 is secured to the first body part 18 with the third fasteners 54 and 55. The first spacer 56, the second spacer 58, and the third spacer 60 are provided between the first body part 18 and the second body part 20 to define a space between the first body part 18 and the second body part 20. The second spacer 58 movably supports the second brake pad 16. The second brake pad 16 includes a guide portion 16A. The second brake pad 16 is movably coupled to the second spacer 58 via the guide portion 16A.

The first spacer 56 has a tubular shape. The second spacer 58 has a tubular shape. The third spacer 60 has a tubular shape. The first fastener 50 extends through the first spacer 56. The first fastener 51 extends through the second spacer 58. The second fastener 53 extends through the third spacer 60.

The disc brake caliper 10 further comprises an axle mounting bracket 62. The axle mounting bracket 62 is configured to couple the first caliper body 12 and the hub axle 4A of the hub assembly 4 of the human-powered vehicle 2. The axle mounting bracket 62 includes a mounting opening 62A through which the hub axle 4A of the hub assembly 4 extends. In the present embodiment, the axle mounting bracket 62 is integrally provided with the first body part 18 as a one-piece unitary member. However, the axle mounting bracket 62 can be a separate member from the first body part 18 if needed and/or desired. The axle mounting bracket 62 can be omitted from the disc brake caliper 10 if needed and/or desired.

Figure 4:
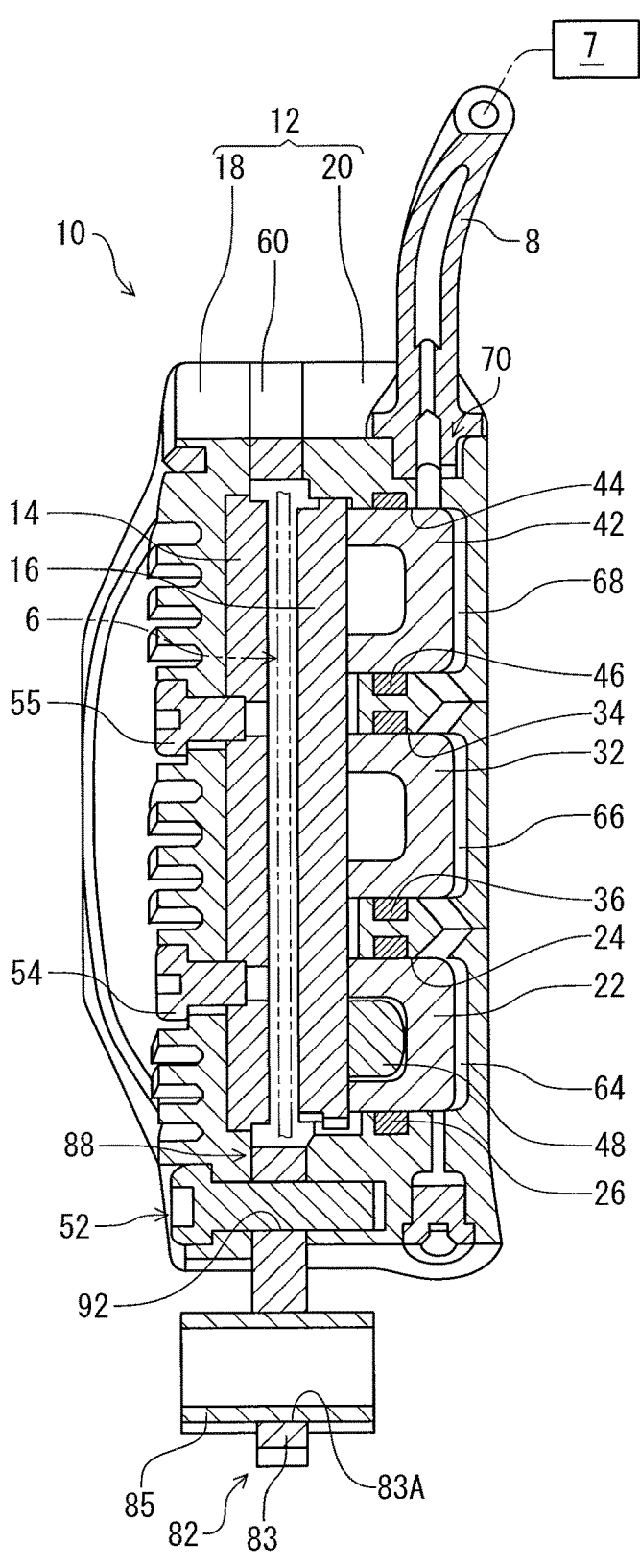
FIG. 4 is a cross-sectional view of the first disc brake caliper taken along line IV-IV of FIG. 6.

As seen in FIG. 4, the second body part 20 is configured to be connected to the operating device 7 via the hydraulic hose 8. The second body part 20 and the piston 22 define a hydraulic chamber 64 in the cylinder hole 24. The second body part 20 and the piston 32 define a hydraulic chamber 66 in the cylinder hole 34. The second body part 20 and the piston 42 define a hydraulic chamber 68 in the cylinder hole 44.

The second body part 20 includes a connector port 70 to which the hydraulic hose 8 is to be connected. The hydraulic chamber 68 is connected to the connector port 70. The hydraulic chamber 68 is connected to the hydraulic chamber 66. The hydraulic chamber 66 is connected to the hydraulic chamber 64. The piston 22 is moved relative to the second body part 20 toward the first body part 18 in response to a hydraulic pressure transmitted to the hydraulic chamber 64. The piston 32 is moved relative to the second body part 20 toward the first body part 18 in response to a hydraulic pressure transmitted to the hydraulic chamber 66. The piston 42 is moved relative to the second body part 20 toward the first brake pad 14 in response to a hydraulic pressure transmitted to the hydraulic chamber 68. The second brake pad 16 is moved toward the first brake pad 14 by the pistons 22, 32, and 42.

Figure 5:
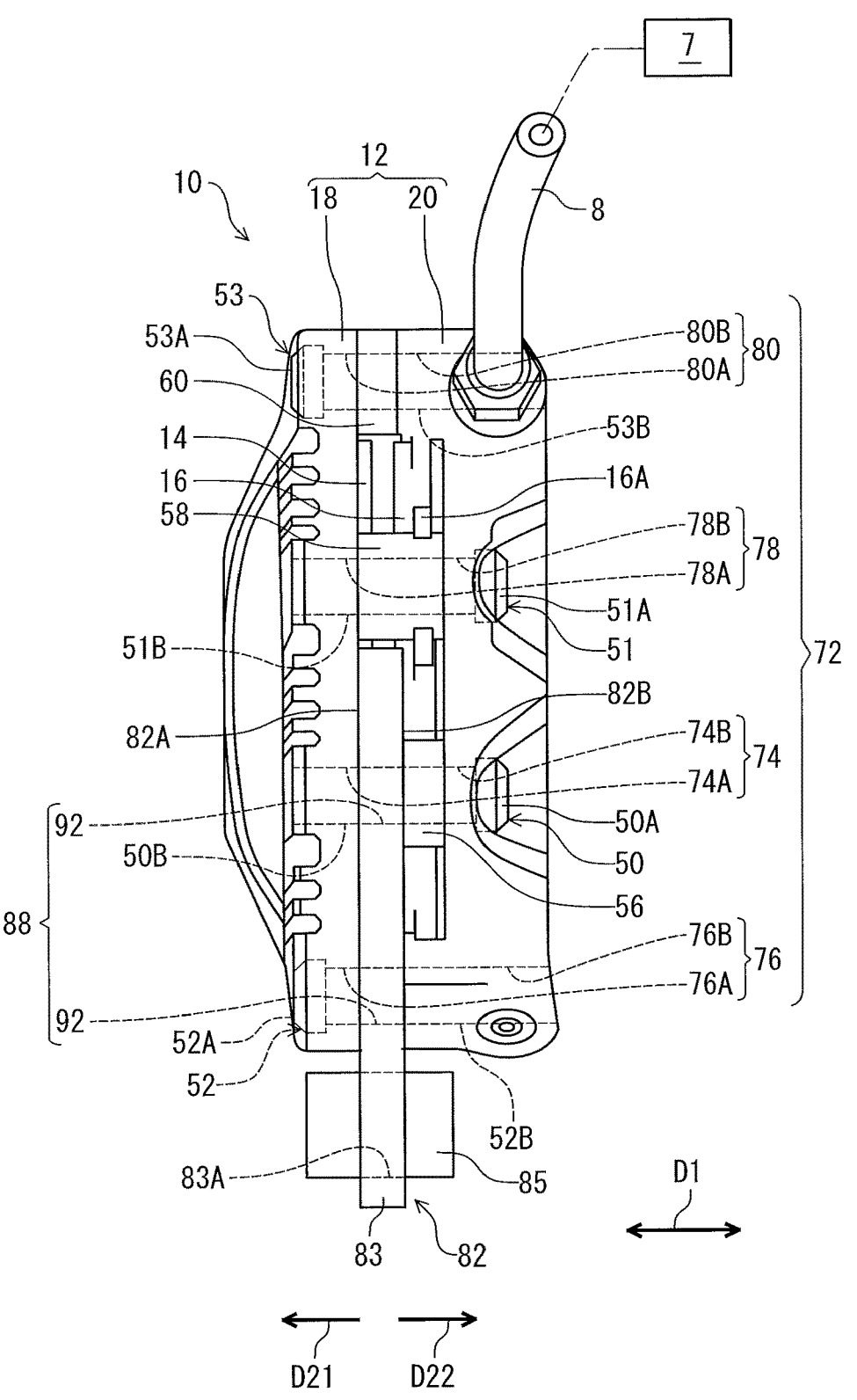
FIG. 5 is a plan view of the first disc brake caliper illustrated in FIG. 1.

As seen in FIG. 5, the first caliper body 12 includes a first caliper coupling portion 72. The first caliper coupling portion 72 includes a first caliper coupling hole 74 and a second caliper coupling hole 76. The first fastener 50 is at least partially provided in the first caliper coupling hole 74. The second fastener 52 is at least partially provided in the second caliper coupling hole 76.

The first caliper coupling hole 74 includes first coupling holes 74A and 74B. The first coupling hole 74A is provided to the first body part 18. The first coupling hole 74B is provided to the second body part 20. The first coupling hole 74A includes a threaded hole. The first fastener 50 includes a head part 50A and a rod part 50B. The head part 50A is provided at an end of the rod part 50B. The rod part 50B includes an externally threaded part engaged with the threaded hole of the first coupling hole 74A.

The second caliper coupling hole 76 includes second coupling holes 76A and 76B. The second coupling hole 76A is provided to the first body part 18. The second coupling hole 76B is provided to the second body part 20. The second coupling hole 76B includes a threaded hole. The second fastener 52 includes a head part 52A and a rod part 52B. The head part 52A is provided at an end of the rod part 52B. The rod part 52B includes an externally threaded part engaged with the threaded hole of the second coupling hole 76B.

The first caliper coupling portion 72 includes a first caliper coupling hole 78 and a second caliper coupling hole 80. The first fastener 51 is at least partially provided in the first caliper coupling hole 78. The second fastener 53 is at least partially provided in the second caliper coupling hole 80.

The first caliper coupling hole 78 includes first coupling holes 78A and 78B. The first coupling hole 78A is provided to the first body part 18. The first coupling hole 78B is provided to the second body part 20. The first coupling hole 78A includes a threaded hole. The first fastener 51 includes a head part 51A and a rod part 51B. The head part 51A is provided at an end of the rod part 51B. The rod part 51B includes an externally threaded part engaged with the threaded hole of the first coupling hole 78A.

The second caliper coupling hole 80 includes second coupling holes 80A and 80B. The second coupling hole 80A is provided to the second body part 20. The second coupling hole 80B is provided to the first body part 18. The second coupling hole 80B includes a threaded hole. The second fastener 53 includes a head part 53A and a rod part 53B. The head part 53A is provided at an end of the rod part 53B. The rod part 53B includes an externally threaded part engaged with the threaded hole of the second coupling hole 80B.

Figure 6:
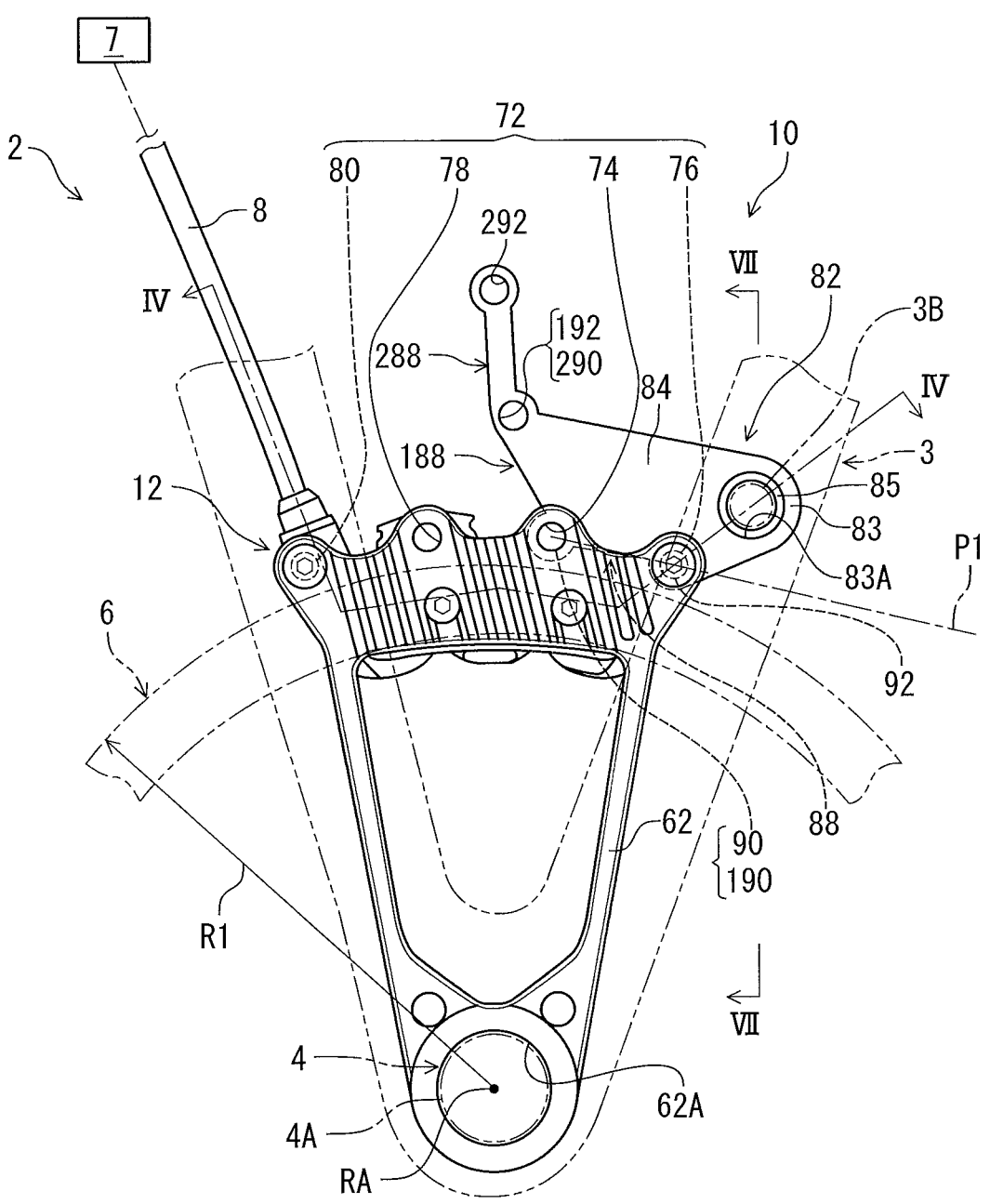
FIG. 6 is a side elevational view of the first disc brake caliper illustrated in FIG. 1.

As seen in FIG. 6, the disc brake caliper 10 for the human-powered vehicle 2 comprises a caliper adaptor 82.

The caliper adaptor 82 is coupled to the first caliper body 12. The caliper adaptor 82 is configured to couple the first caliper body 12 and the vehicle body 3. The first caliper body 12 is mounted to the vehicle body 3 via the caliper adaptor 82.

Figure 7:
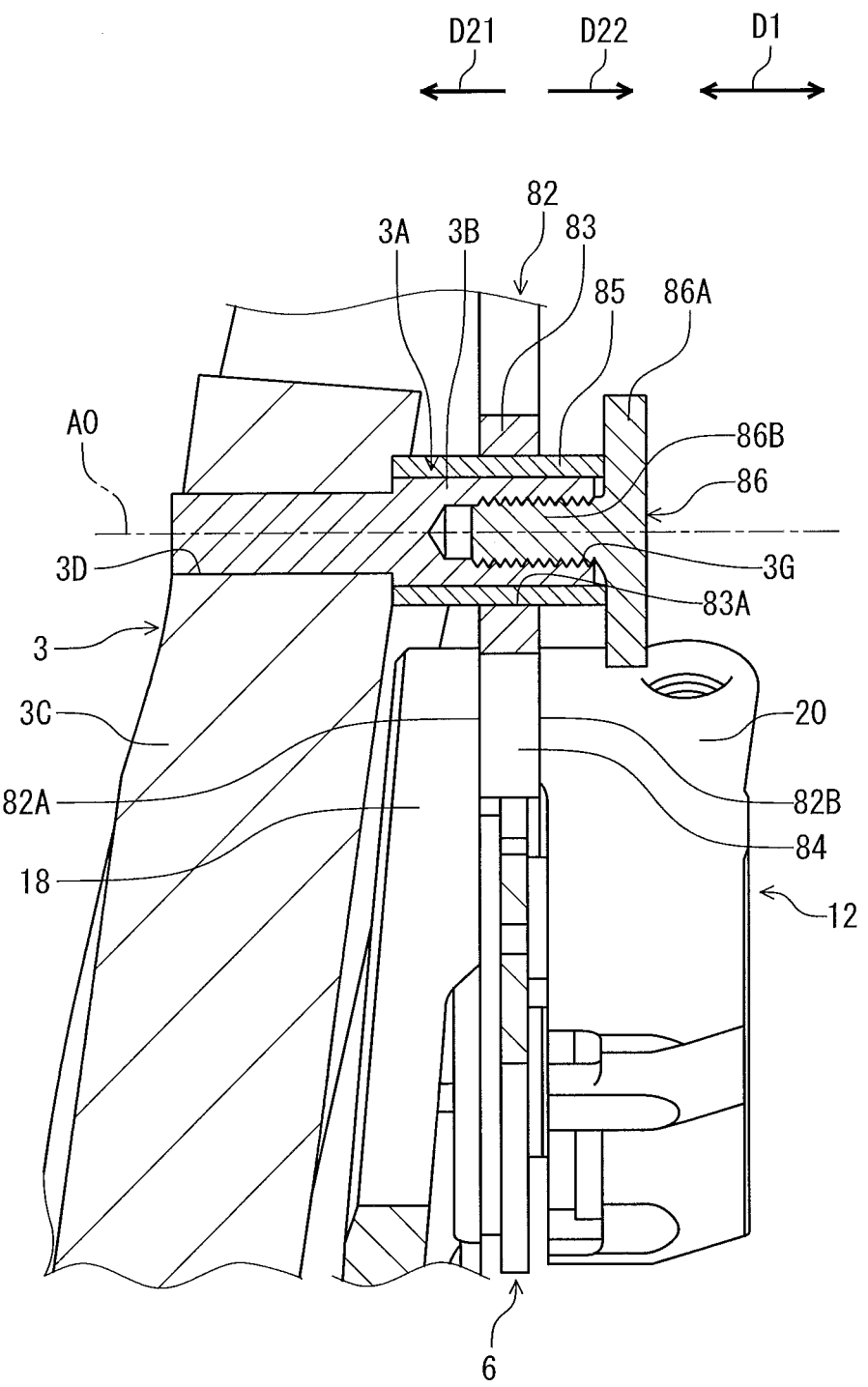
FIG. 7 is a cross-sectional view of the first disc brake caliper taken along line VII-VII of FIG. 6.

As seen in FIG. 7, the caliper adaptor 82 for the disc brake caliper 10 of the human-powered vehicle 2 comprises a frame coupling portion 83. The frame coupling portion 83 is configured to be mounted to a mounting portion 3A of the vehicle body 3 of the human-powered vehicle 2. The frame coupling portion 83 includes a frame coupling hole 83A in which a protruding portion 3B of the mounting portion 3A is to be at least partially provided. The frame coupling portion 83 extends in the axial direction D1 in a coupling state where the mounting portion 3A is mounted to the frame coupling portion 83. The frame coupling hole 83A extends in the axial direction D1 in a coupling state where the protruding portion 3B is at least partially provided in the frame coupling hole 83A.

In the present embodiment, the protruding portion 3B is partially provided in the frame coupling hole 83A in the coupling state where the mounting portion 3A is mounted to the frame coupling portion 83. The frame coupling hole 83A extends in the axial direction D1 in the coupling state where the protruding portion 3B is partially provided in the frame coupling hole 83A. However, the protruding portion 3B can be entirely provided in the frame coupling hole 83A if needed and/or desired.

The vehicle body 3 includes a frame 3C including a hole 3D. The mounting portion 3A is partially provided in the hole 3D. The mounting portion 3A is secured to the frame 3C with a securing structure such as an adhesive, press-fitting, and insert molding. The protruding portion 3B of the mounting portion 3A protrudes from the frame 3C in the axial direction D1. In the present embodiment, the mounting portion 3A is a separate member from the frame 3C. However, the mounting portion 3A can be integrally provided with the frame 3C as a one-piece unitary member.

In the present embodiment, the caliper adaptor 82 includes an adaptor body 84. The adaptor body 84 includes the frame coupling portion 83. The adaptor body 84 has a flat shape such as a plate. However, the adaptor body 84 can have shapes other than the flat shape if needed and/or desired. The caliper adaptor 82 can have structures other than the adaptor body 84 if needed and/or desired.

As seen in FIG. 7, the caliper adaptor 82 further comprises a sleeve 85. The sleeve 85 is provided in the frame coupling hole 83A. The sleeve 85 includes a sleeve hole 85A in which the protruding portion 3B of the mounting portion 3A is to be at least partially provided. The sleeve 85 is provided between the frame coupling portion 83 and the protruding portion 3B of the mounting portion 3A in the coupling state where the mounting portion 3A is mounted to the frame coupling portion 83.

In the present embodiment, the sleeve 85 is a separate member from the adaptor body 84. The sleeve 85 is a separate member from the frame coupling portion 83. The sleeve 85 is made of a non-metallic material. The sleeve 85 is made of a resin material. Examples of the resin material include rubber and plastic. The adaptor body 84 is made of a material different from the material of the sleeve 85. The adaptor body 84 is made of a metallic material. The sleeve 85 is elastically deformable between the frame coupling portion 83 and the protruding portion 3B of the mounting portion 3A. However, the material of the sleeve 85 is not limited to the non-metallic material. The material of the sleeve 85 is not limited to the resin material. The sleeve 85 can be omitted from the caliper adaptor 82 if needed and/or desired. The material of the adaptor body 84 is not limited to the metallic material.

The caliper adaptor 82 includes a mounting fastener 86. The mounting fastener 86 is configured to fasten the frame coupling portion 83 to the protruding portion 3B of the mounting portion 3A. The protruding portion 3B includes a threaded hole 3G. The mounting fastener 86 includes a head part 86A and a rod part 86B. The head part 86A is provided at an end of the rod part 86B. The rod part 86B includes an externally threaded part engaged with the threaded hole 3G of the protruding portion 3B. The sleeve 85 is held between the frame 3C and the head part 86A of the mounting fastener 86.

As seen in FIG. 6, the caliper adaptor 82 for the disc brake caliper 10 of the human-powered vehicle 2 comprises a first coupling portion 88. The adaptor body 84 includes the first coupling portion 88. The first coupling portion 88 is configured to be coupled to the first caliper body 12 of the disc brake caliper 10 in a first state where the first caliper body 12 is in a first radial position P1 relative to the rotational axis RA. The first coupling portion 88 of the caliper adaptor 82 is configured to be coupled to the first caliper coupling portion 72 in the first state. The first coupling portion 88 of the caliper adaptor 82 is configured to be coupled to the first caliper coupling hole 74 and the second caliper coupling hole 76 in the first state.

In the present embodiment, the first radial position P1 is defined based on the first caliper coupling hole 74 and the second caliper coupling hole 76 in the first state. However, the first radial position P1 can be defined based on portions other than the first caliper coupling hole 74 and the second caliper coupling hole 76 if needed and/or desired.

In the present embodiment, the first coupling portion 88 is provided radially inwardly of the frame coupling portion 83 in a first coupling state where the frame coupling portion 83 is coupled to the protruding portion 3B and where the first coupling portion 88 is coupled to the first caliper body 12. However, the first coupling portion 88 can be provided radially outwardly of the frame coupling portion 83 in the first coupling state if needed and/or desired. The first coupling portion 88 can be omitted from the caliper adaptor 82 if needed and/or desired.

Figure 8:
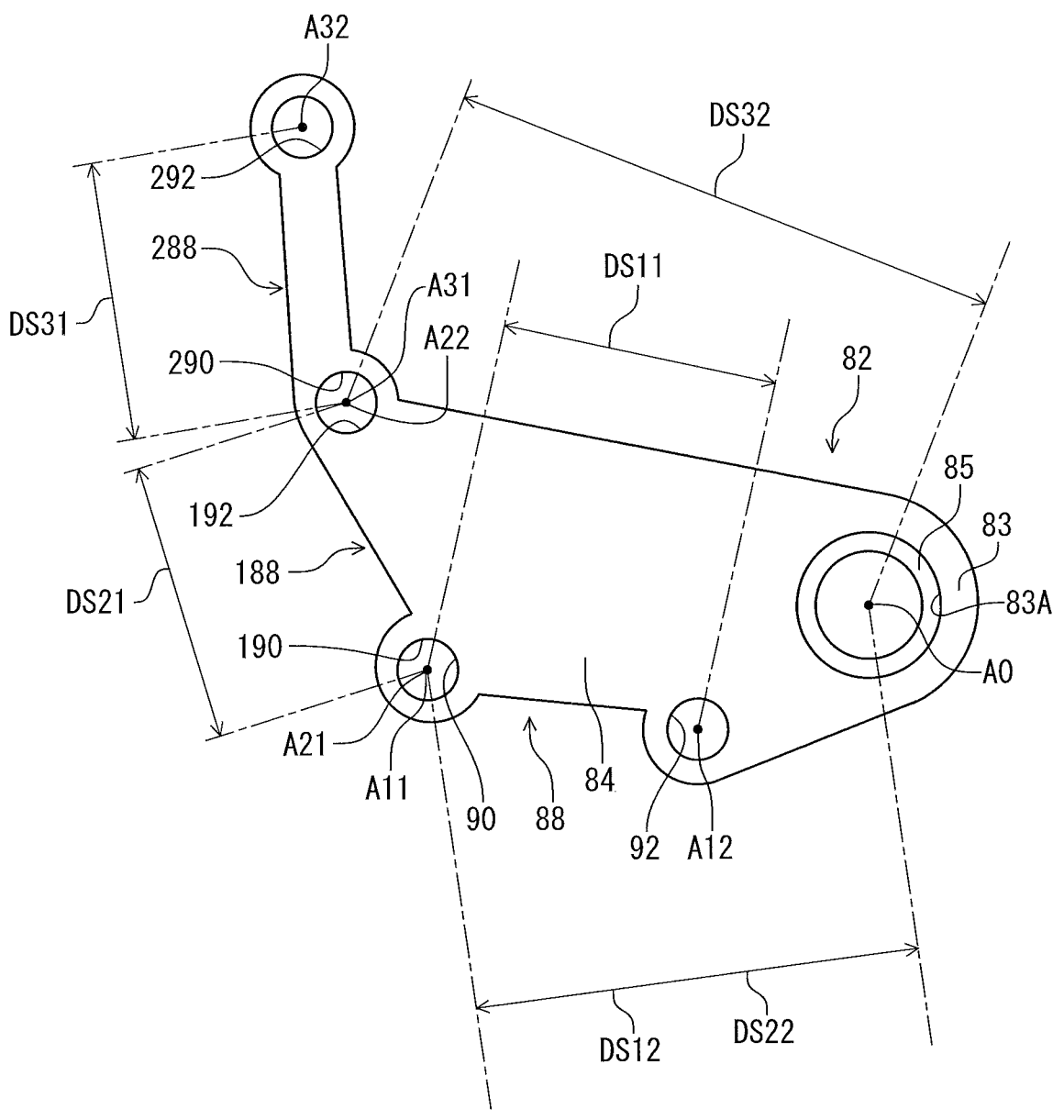
FIG. 8 is a side elevational view of a caliper adaptor of the first disc brake caliper illustrated in FIG. 1.

As seen in FIG. 8, the first coupling portion 88 includes a first hole 90. The first coupling portion 88 includes a first additional hole 92. The first additional hole 92 is spaced apart from the first hole 90. The first hole 90 is spaced apart from the frame coupling hole 83A. The first additional hole 92 is spaced apart from the frame coupling hole 83A. The first additional hole 92 is provided closer to the frame coupling hole 83A than the first hole 90. However, the first hole 90 can be provided closer to the frame coupling hole 83A than the first additional hole 92 if needed and/or desired. A distance defined between the first hole 90 and the frame coupling hole 83A can be equal to a distance between the first additional hole 92 and the frame coupling hole 83A if needed and/or desired.

As seen in FIG. 5, the caliper adaptor 82 is at least partially provided between the first body part 18 and the second body part 20. The caliper adaptor 82 and the first spacer 56 are at least partially provided between the first body part 18 and the second body part 20. The caliper adaptor 82 is at least partially provided between the first body part 18 and the first spacer 56. In the present embodiment, the caliper adaptor 82 is partially provided between the first body part 18 and the second body part 20. The first spacer 56 is entirely provided between the first body part 18 and the second body part 20. The caliper adaptor 82 is partially provided between the first body part 18 and the first spacer 56. However, the caliper adaptor 82 can be entirely provided between the first body part 18 and the second body part 20 if needed and/or desired. The first spacer 56 can be partially provided between the first body part 18 and the second body part 20 if needed and/or desired. The caliper adaptor 82 can be entirely provided between the first body part 18 and the first spacer 56 if needed and/or desired.

The first coupling portion 88 is at least partially provided between the first body part 18 and the second body part 20. The first coupling portion 88 and the first spacer 56 are at least partially provided between the first body part 18 and the second body part 20. The first coupling portion 88 is at least partially provided between the first body part 18 and the first spacer 56. In the present embodiment, the first coupling portion 88 is partially provided between the first body part 18 and the second body part 20. The first spacer 56 is entirely provided between the first body part 18 and the second body part 20. The first coupling portion 88 is partially provided between the first body part 18 and the first spacer 56. However, the first coupling portion 88 can be entirely provided between the first body part 18 and the second body part 20 if needed and/or desired. The first spacer 56 can be partially provided between the first body part 18 and the second body part 20 if needed and/or desired. The first coupling portion 88 can be entirely provided between the first body part 18 and the first spacer 56 if needed and/or desired.

The first coupling portion 88 extends in the axial direction D1 in the first state. The first hole 90 extends in the axial direction D1 in the first state. The first additional hole 92 extends in the axial direction D1 in the first state.

The first coupling portion 88 is configured to be coupled to the first caliper body 12 in the first state via the first hole 90. The first hole 90 corresponds to the first caliper coupling hole 74. The first hole 90 is coaxially provided with the first caliper coupling hole 74 in the first state. The first hole 90 is provided between the first coupling holes 74A and 74B in the first state. The first fastener 50 extends through the first hole 90 in the first state.

The first coupling portion 88 is configured to be coupled to the first caliper body 12 in the first state via the first hole 90 and the first additional hole 92. The first additional hole 92 corresponds to the second caliper coupling hole 76. The first additional hole 92 is coaxially provided with the second caliper coupling hole 76 in the first state. The first additional hole 92 is provided between the second coupling holes 76A and 76B in the first state. The second fastener 52 extends through the first additional hole 92 in the first state.

Figure 9:
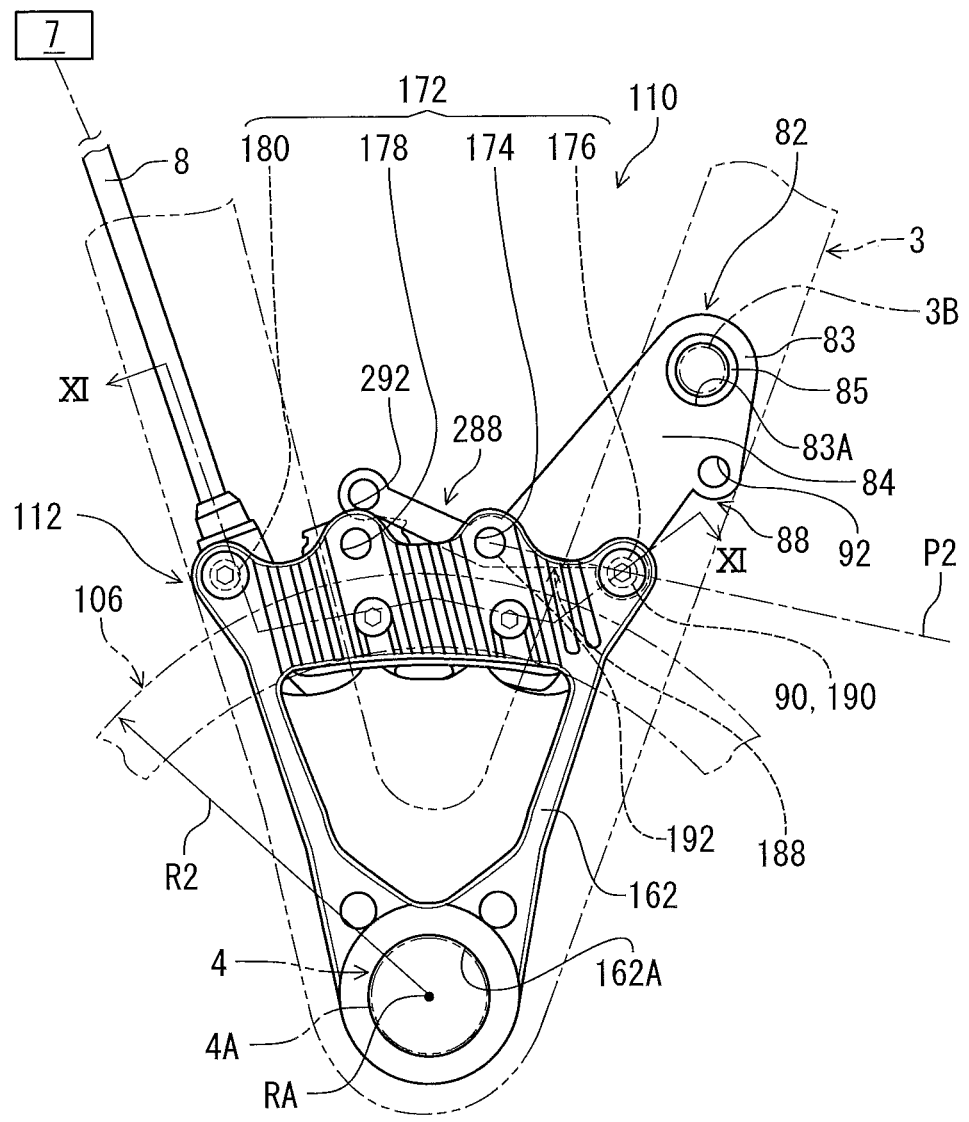
FIG. 9 is a side elevational view of a second disc brake caliper in accordance with the first embodiment.

As seen in FIG. 9, the human-powered vehicle 2 can include a disc brake rotor 106 and a disc brake caliper 110 instead of the disc brake rotor 6 and the disc brake caliper 10. The disc brake rotor 106 has substantially the same structure as the structure of the disc brake rotor 6. The disc brake rotor 106 has a second outer radius R2. The second outer radius R2 is different from the first outer radius R1. The second outer radius R2 is smaller than the first outer radius R1. However, the second outer radius R2 can be larger than the first outer radius R1 if needed and/or desired.

The disc brake caliper 110 has substantially the same structure as the structure of the disc brake caliper 10. The disc brake caliper 110 is coupled to the vehicle body 3. The disc brake caliper 110 is configured to apply a braking force to the disc brake rotor 106. The disc brake caliper 110 is connected to the operating device 7 via the hydraulic hose 8. The disc brake rotor 106 can be referred to a second disc brake rotor 106. The disc brake caliper 110 can also be referred to as a second disc brake caliper 110.

Figure 10:
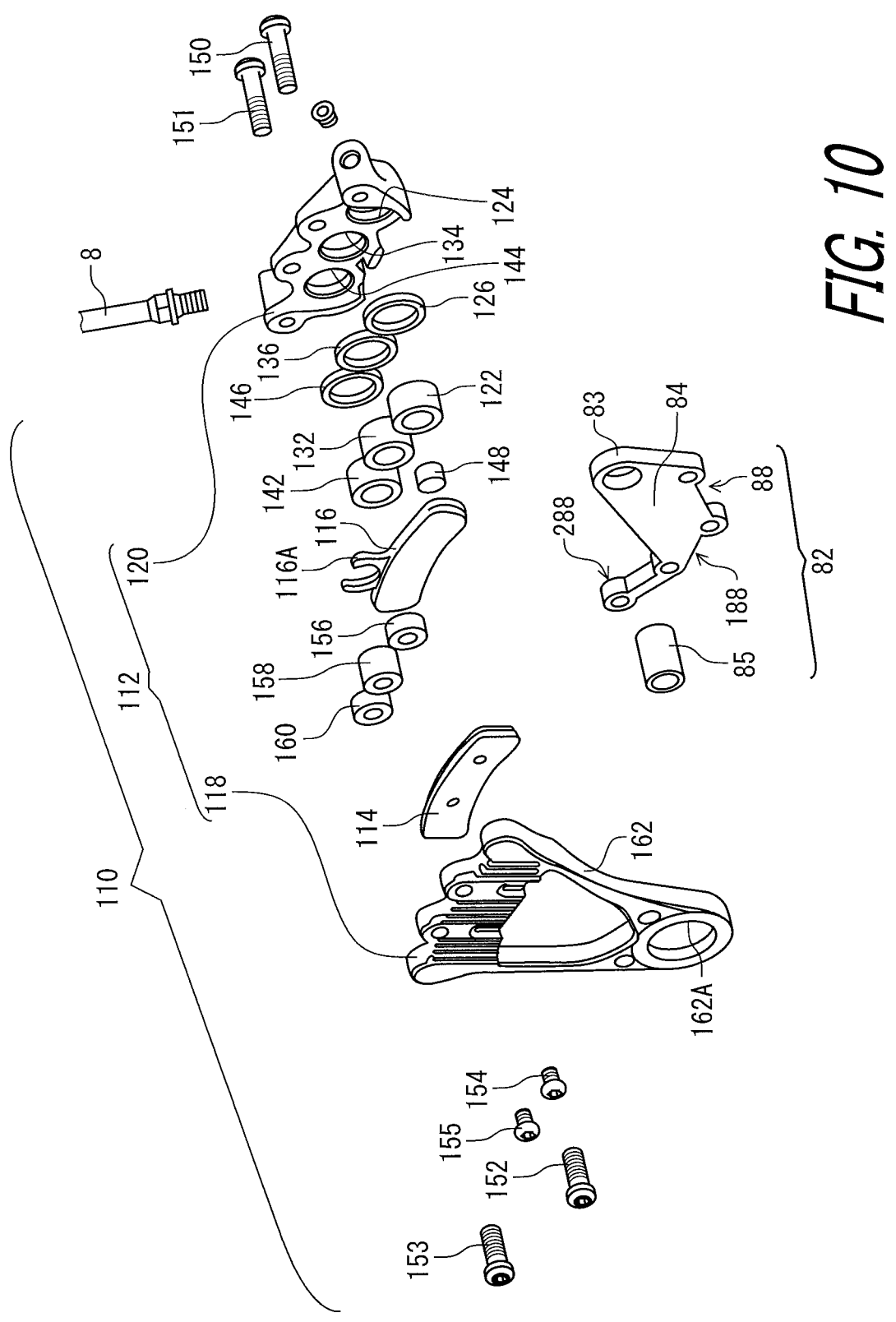
FIG. 10 is an exploded perspective view of the second disc brake caliper illustrated in FIG. 9.

As seen in FIG. 10, the disc brake caliper 110 for the human-powered vehicle 2 comprises a caliper body 112, a first brake pad 114, and a second brake pad 116. The caliper body 112 includes a first body part 118 and a second body part 120. The first brake pad 114 is coupled to the first body part 118. The second brake pad 116 is movable relative to the second body part 120.

In the present embodiment, the first brake pad 114 is secured to the first body part 118. The first brake pad 114 is separate member from the first body part 118. The first body part 118 is a separate member from the second body part 120. However, the first body part 118 can be integrally provided with the second body part 120 as a one-piece unitary member if needed and/or desired. The first brake pad 114 can be integrally provided with the first body part 118 as a one-piece unitary member if needed and/or desired. The caliper body 112 can also be referred to as a second caliper body 112.

The second caliper body 112 has substantially the same structure as the structure of the first caliper body 12 of the first disc brake caliper 10. The first body part 118 has substantially the same structure as the structure of the first body part 18 of the first disc brake caliper 10. The second body part 120 has substantially the same structure as the structure of the second body part 20 of the first disc brake caliper 10. The first brake pad 114 has substantially the same structure as the structure of the first brake pad 14 of the first disc brake caliper 10. The second brake pad 116 has substantially the same structure as the structure of the second brake pad 16 of the first disc brake caliper 10. However, the second caliper body 112 can have a structure different from the structure of the first caliper body 12 of the first disc brake caliper 10 if needed and/or desired. The first brake pad 114 can have a structure different from the structure of the first brake pad 14 of the first disc brake caliper 10 if needed and/or desired. The second brake pad 116 can have a structure different from the structure of the second brake pad 16 of the first disc brake caliper 10 if needed and/or desired.

The disc brake caliper 110 further comprises a piston 122. The second caliper body 112 includes a cylinder hole 124. The second body part 120 includes the cylinder hole 124. The piston 122 is movably provided in the cylinder hole 124. The disc brake caliper 110 further comprises a seal member 126. The seal member 126 is provided between the second body part 120 and the piston 122.

The disc brake caliper 110 further comprises a piston 132. The second caliper body 112 includes a cylinder hole 134. The second body part 120 includes the cylinder hole 134. The piston 132 is movably provided in the cylinder hole 134. The disc brake caliper 110 further comprises a seal member 136. The seal member 136 is provided between the second body part 120 and the piston 132.

The disc brake caliper 110 further comprises a piston 142. The second caliper body 112 includes a cylinder hole 144. The second body part 120 includes the cylinder hole 144. The piston 142 is movably provided in the cylinder hole 144. The disc brake caliper 110 further comprises a seal member 146. The seal member 146 is provided between the second body part 120 and the piston 142.

In the present embodiment, the disc brake caliper 110 includes the pistons 122, 132, and 142 and the seal member 126, 136, and 146. The second caliper body 112 includes cylinder holes 124, 134, and 144. However, the disc brake caliper 110 can include at least one piston if needed and/or desired. The second caliper body 112 can include at least one cylinder hole if needed and/or desired. The disc brake caliper 110 can include at least one seal member if needed and/or desired.

The disc brake caliper 110 further comprises a magnetic body 148 coupled to the piston 122. The magnetic body 148 includes a magnet. The magnetic body 148 is secured to the piston 122 with a securing structure such as an adhesive, press-fitting, and insertion molding. The second brake pad 116 includes a magnetic material. The second brake pad 116 is magnetically attracted toward the magnetic body 148 to be moved along with the piston 122. The magnetic body 148 can be coupled to at least one of the pistons 122, 132, and 142 if needed and/or desired. In such modifications, the disc brake caliper 110 includes at least two magnetic body 148.

The disc brake caliper 110 comprises first fasteners 150 and 151, second fasteners 152 and 153, third fasteners 154 and 155, a first spacer 156, a second spacer 158, and a third spacer 160. The first body part 118 is secured to the second body part 120 with the first fasteners 150 and 151. The first body part 118 is secured to the second body part 120 with the second fasteners 152 and 153. Examples of each of the first fasteners 150 and 151, the second fasteners 152 and 153, and the third fasteners 154 and 155 include a screw, a rivet, and a combination of a bolt and a nut.

The first brake pad 114 is secured to the first body part 118 with the third fasteners 154 and 155. The first spacer 156, the second spacer 158, and the third spacer 160 are provided between the first body part 118 and the second body part 120 to define a space between the first body part 118 and the second body part 120. The second spacer 158 movably supports the second brake pad 116. The second brake pad 116 includes a guide portion 116A. The second brake pad 116 is movably coupled to the second spacer 158 via the guide portion 116A.

The first spacer 156 has a tubular shape. The second spacer 158 has a tubular shape. The third spacer 160 has a tubular shape. The first fastener 150 extends through the first spacer 156. The first fastener 151 extends through the second spacer 158. The second fastener 153 extends through the third spacer 160.

The disc brake caliper 110 further comprises an axle mounting bracket 162. The axle mounting bracket 162 is configured to couple the caliper body 112 and the hub axle 4A of the hub assembly 4 of the human-powered vehicle 2. The axle mounting bracket 162 includes a mounting opening 162A through which the hub axle 4A of the hub assembly 4 extends. In the present embodiment, the axle mounting bracket 162 is integrally provided with the first body part 118 as a one-piece unitary member. The axle mounting bracket 162 is shorter than the axle mounting bracket 62 (see e.g., FIG. 6) of the disc brake caliper 10. However, the axle mounting bracket 162 can be a separate member from the first body part 118 if needed and/or desired. The axle mounting bracket 162 can be omitted from the disc brake caliper 110 if needed and/or desired. The axle mounting bracket 162 can be longer than the axle mounting bracket 62 (see e.g., FIG. 3) of the disc brake caliper 10 if needed and/or desired. The first body part 118 can have the structure different from the structure of the first body part 18 (see e.g., FIG. 3) of the first disc brake caliper 10 in a case where the axle mounting bracket 162 is integrally provided with the first body part 118 as a one-piece unitary member.

Figure 11:
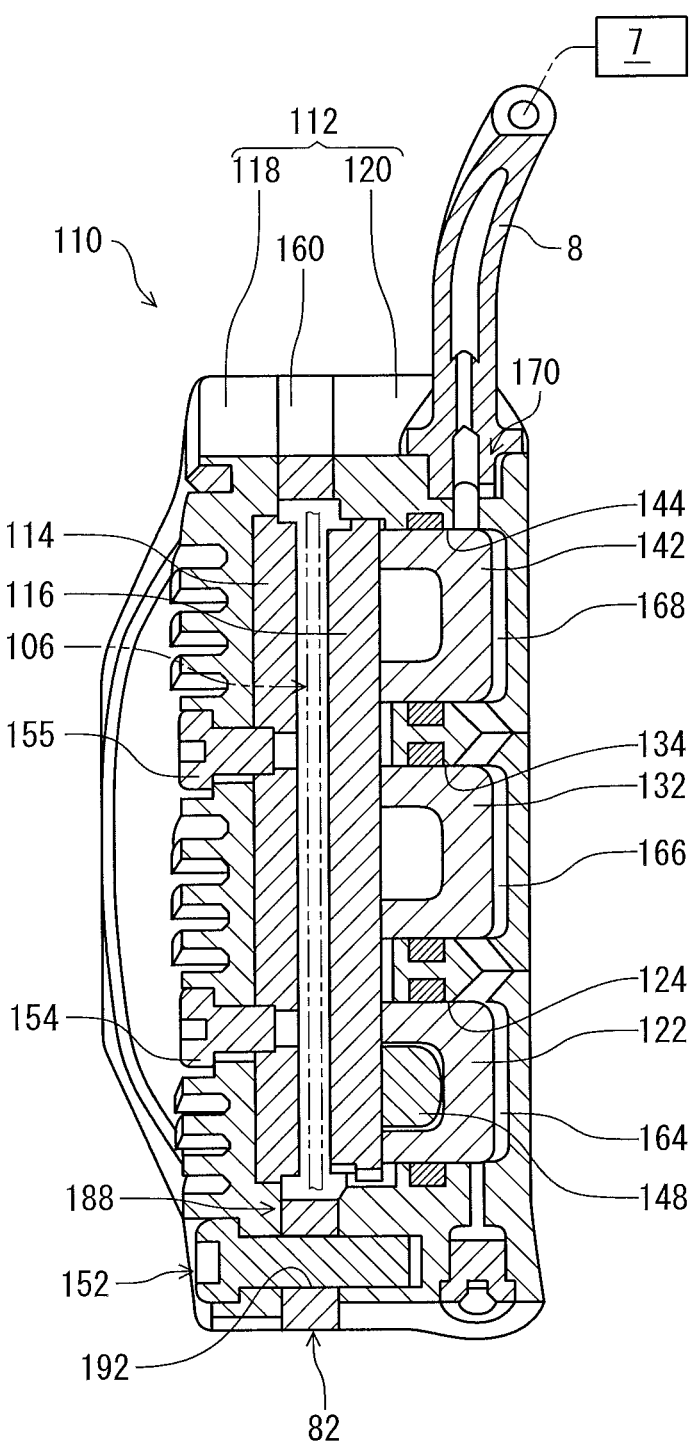
FIG. 11 is a cross-sectional view of the second disc brake caliper taken along line XI-XI of FIG. 9.

As seen in FIG. 11, the second body part 120 is configured to be connected to the operating device 7 via the hydraulic hose 8. The second body part 120 and the piston 122 define a hydraulic chamber 164 in the cylinder hole 124. The second body part 120 and the piston 132 define a hydraulic chamber 166 in the cylinder hole 134. The second body part 120 and the piston 142 define a hydraulic chamber 168 in the cylinder hole 144.

The second body part 120 includes a connector port 170 to which the hydraulic hose 8 is to be connected. The hydraulic chamber 168 is connected to the connector port 170. The hydraulic chamber 168 is connected to the hydraulic chamber 166. The hydraulic chamber 166 is connected to the hydraulic chamber 164. The piston 122 is moved relative to the second body part 120 toward the first body part 118 in response to a hydraulic pressure transmitted to the hydraulic chamber 164. The piston 132 is moved relative to the second body part 120 toward the first body part 118 in response to a hydraulic pressure transmitted to the hydraulic chamber 166. The piston 142 is moved relative to the second body part 120 toward the first brake pad 114 in response to a hydraulic pressure transmitted to the hydraulic chamber 168. The second brake pad 116 is moved toward the first brake pad 114 by the pistons 122, 132, and 142.

Figure 12:
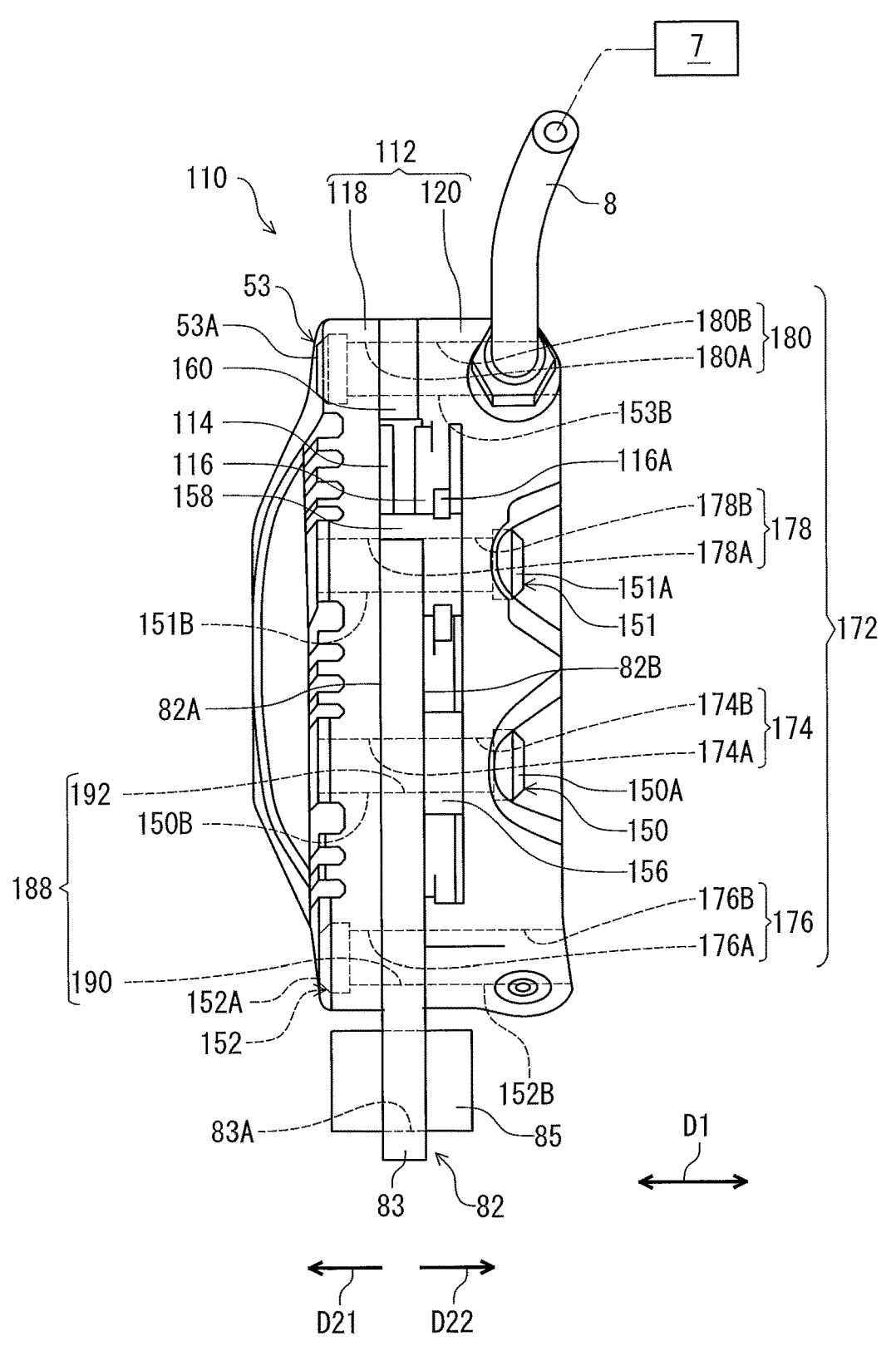
FIG. 12 is a plan view of the second disc brake caliper illustrated in FIG. 9.

As seen in FIG. 12, the second caliper body 112 includes a second caliper coupling portion 172. The second caliper coupling portion 172 includes a third caliper coupling hole 174 and a fourth caliper coupling hole 176. The first fastener 150 is at least partially provided in the third caliper coupling hole 174. The second fastener 152 is at least partially provided in the fourth caliper coupling hole 176.

The third caliper coupling hole 174 includes third coupling holes 174A and 174B. The third coupling hole 174A is provided to the first body part 118. The third coupling hole 174B is provided to the second body part 120. The third coupling hole 174A includes a threaded hole. The first fastener 150 includes a head part 150A and a rod part 150B. The head part 150A is provided at an end of the rod part 150B. The rod part 150B includes an externally threaded part engaged with the threaded hole of the third coupling hole 174A.

The fourth caliper coupling hole 176 includes fourth coupling holes 176A and 176B. The fourth coupling hole 176A is provided to the first body part 118. The fourth coupling hole 176B is provided to the second body part 120. The fourth coupling hole 176B includes a threaded hole. The second fastener 152 includes a head part 152A and a rod part 152B. The head part 152A is provided at an end of the rod part 152B. The rod part 152B includes an externally threaded part engaged with the threaded hole of the fourth coupling hole 176B.

The second caliper coupling portion 172 includes a third caliper coupling hole 178 and a fourth caliper coupling hole 180. The first fastener 151 is at least partially provided in the third caliper coupling hole 178. The second fastener 153 is at least partially provided in the fourth caliper coupling hole 180.

The third caliper coupling hole 178 includes third coupling holes 178A and 178B. The third coupling hole 178A is provided to the first body part 118. The third coupling hole 178B is provided to the second body part 120. The third coupling hole 178A includes a threaded hole. The first fastener 151 includes a head part 151A and a rod part 151B. The head part 151A is provided at an end of the rod part 151B. The rod part 151B includes an externally threaded part engaged with the threaded hole of the third coupling hole 178A.

The fourth caliper coupling hole 180 includes fourth coupling holes 180A and 180B. The fourth coupling hole 180A is provided to the second body part 120. The fourth coupling hole 180B is provided to the first body part 118. The fourth coupling hole 180B includes a threaded hole. The second fastener 153 includes a head part 153A and a rod part 153B. The head part 153A is provided at an end of the rod part 153B. The rod part 153B includes an externally threaded part engaged with the threaded hole of the fourth coupling hole 180B.

As seen in FIG. 9, the disc brake caliper 110 for the human-powered vehicle 2 comprises the caliper adaptor 82. The caliper adaptor 82 is coupled to the second caliper body 112. The caliper adaptor 82 is configured to couple the second caliper body 112 and the vehicle body 3. The second caliper body 112 is mounted to the vehicle body 3 via the caliper adaptor 82.

The caliper adaptor 82 for the disc brake caliper 110 of the human-powered vehicle 2 comprises a second coupling portion 188. The adaptor body 84 includes the second coupling portion 188. The second coupling portion 188 is configured to be coupled to the second caliper body 112 in a second state where the second caliper body 112 is in a second radial position P2 relative to the rotational axis RA. The second coupling portion 188 of the caliper adaptor 82 is configured to be coupled to the second caliper coupling portion 172 in the second state. The second coupling portion 188 of the caliper adaptor 82 is configured to be coupled to the third caliper coupling hole 174 and the fourth caliper coupling hole 176 in the second state.

In the present embodiment, the second radial position P2 is defined based on the third caliper coupling hole 174 and the fourth caliper coupling hole 176 in the second state. However, the second radial position P2 can be defined based on portions other than the third caliper coupling hole 174 and the fourth caliper coupling hole 176 if needed and/or desired.

In the present embodiment, the second coupling portion 188 is provided radially inwardly of the frame coupling portion 83 in a second coupling state where the frame coupling portion 83 is coupled to the protruding portion 3B and where the second coupling portion 188 is coupled to the second caliper body 112. However, the second coupling portion 188 can be provided radially outwardly of the frame coupling portion 83 in the second coupling state if needed and/or desired. The second coupling portion 188 can be omitted from the caliper adaptor 82 if needed and/or desired.

As seen in FIG. 8, the second coupling portion 188 includes a second hole 190. The second coupling portion 188 includes a second additional hole 192. The second additional hole 192 is spaced apart from the second hole 190. The second hole 190 is spaced apart from the frame coupling hole 83A. The second additional hole 192 is spaced apart from the frame coupling hole 83A. The second hole 190 is provided closer to the frame coupling hole 83A than the second additional hole 192. However, the second additional hole 192 can be provided closer to the frame coupling hole 83A than the second hole 190 if needed and/or desired. A distance defined between the second hole 190 and the frame coupling hole 83A can be equal to a distance between the second additional hole 192 and the frame coupling hole 83A if needed and/or desired.

As seen in FIG. 12, the caliper adaptor 82 is at least partially provided between the first body part 118 and the second body part 120. The caliper adaptor 82 and the first spacer 156 are at least partially provided between the first body part 118 and the second body part 120. The caliper adaptor 82 is at least partially provided between the first body part 118 and the first spacer 156. In the present embodiment, the caliper adaptor 82 is partially provided between the first body part 118 and the second body part 120. The first spacer 156 is entirely provided between the first body part 118 and the second body part 120. The caliper adaptor 82 is partially provided between the first body part 118 and the first spacer 156. However, the caliper adaptor 82 can be entirely provided between the first body part 118 and the second body part 120 if needed and/or desired. The first spacer 156 can be partially provided between the first body part 118 and the second body part 120 if needed and/or desired. The caliper adaptor 82 can be entirely provided between the first body part 118 and the first spacer 156 if needed and/or desired.

The second coupling portion 188 is at least partially provided between the first body part 118 and the second body part 120. The second coupling portion 188 and the first spacer 156 are at least partially provided between the first body part 118 and the second body part 120. The second coupling portion 188 is at least partially provided between the first body part 118 and the first spacer 156. In the present embodiment, the second coupling portion 188 is partially provided between the first body part 118 and the second body part 120. The first spacer 156 is entirely provided between the first body part 118 and the second body part 120. The second coupling portion 188 is partially provided between the first body part 118 and the first spacer 156. However, the second coupling portion 188 can be entirely provided between the first body part 118 and the second body part 120 if needed and/or desired. The first spacer 156 can be partially provided between the first body part 118 and the second body part 120 if needed and/or desired. The second coupling portion 188 can be entirely provided between the first body part 118 and the first spacer 156 if needed and/or desired.

The second coupling portion 188 extends in the axial direction D1 in the second state. The second hole 190 extends in the axial direction D1 in the second state. The second additional hole 192 extends in the axial direction D1 in the second state.

The second coupling portion 188 is configured to be coupled to the second caliper body 112 in the second state via the second hole 190. The second hole 190 corresponds to the fourth caliper coupling hole 176. The second hole 190 is coaxially provided with the fourth caliper coupling hole 176 in the second state. The second hole 190 is provided between the fourth coupling holes 176A and 176B in the second state. The second fastener 152 extends through the second hole 190 in the second state.

The second coupling portion 188 is configured to be coupled to the second caliper body 112 in the second state via the second hole 190 and the second additional hole 192. The second additional hole 192 corresponds to the third caliper coupling hole 174. The second additional hole 192 is coaxially provided with the third caliper coupling hole 174 in the second state. The second additional hole 192 is provided between the third coupling holes 174A and 174B in the second state. The first fastener 150 extends through the second additional hole 192 in the second state.

As seen in FIGS. 6 and 9, the second radial position P2 is different from the first radial position P1. The second radial position P2 is provided radially inwardly of the first radial position P1. The second radial position P2 is provided closer to the rotational axis RA than the first radial position P1. However, the second radial position P2 can be provided radially outwardly of the first radial position P1 if needed and/or desired. The second radial position P2 can be provided farther from the rotational axis RA than the first radial position P1 if needed and/or desired.

Figure 13:
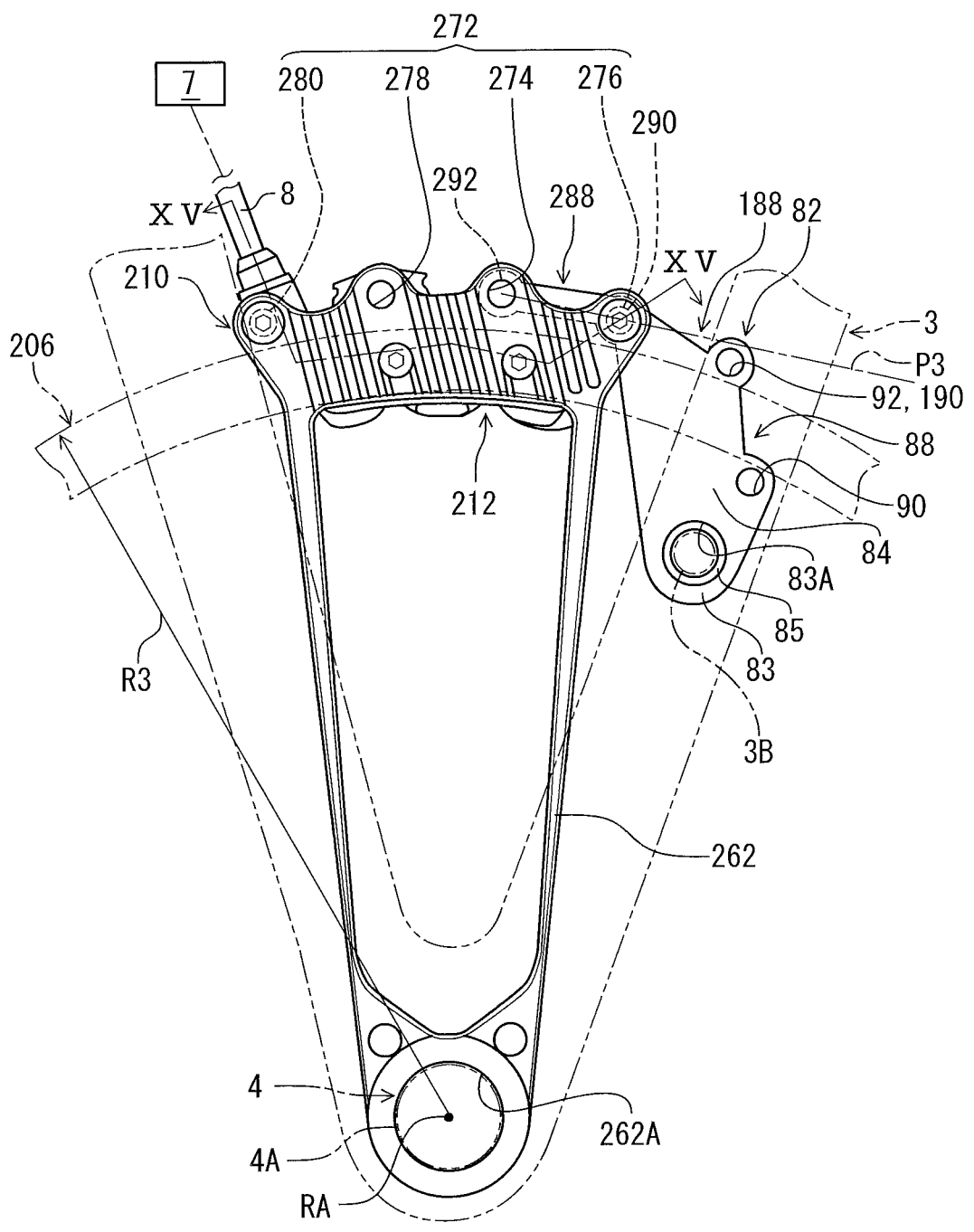
FIG. 13 is a side elevational view of a third disc brake caliper in accordance with the first embodiment.

As seen in FIG. 13, the human-powered vehicle 2 can include a disc brake rotor 206 and a disc brake caliper 210 instead of the disc brake rotor 6 and the disc brake caliper 10. The disc brake rotor 206 has substantially the same structure as the structure of the disc brake rotor 6. The disc brake rotor 206 has a third outer radius R3. The third outer radius R3 is different from the first outer radius R1 and the second outer radius R2. The third outer radius R3 is larger than the first outer radius R1 and the second outer radius R2. However, the third outer radius R3 can be smaller than at least one of the first outer radius R1 and the second outer radius R2 if needed and/or desired.

The disc brake caliper 210 has substantially the same structure as the structure of the disc brake caliper 10. The disc brake caliper 210 is coupled to the vehicle body 3. The disc brake caliper 210 is configured to apply a braking force to the disc brake rotor 206. The disc brake caliper 210 is connected to the operating device 7 via the hydraulic hose 8. The disc brake rotor 206 can be referred to a third disc brake rotor 206. The disc brake caliper 210 can also be referred to as a third disc brake caliper 210.

Figure 14:
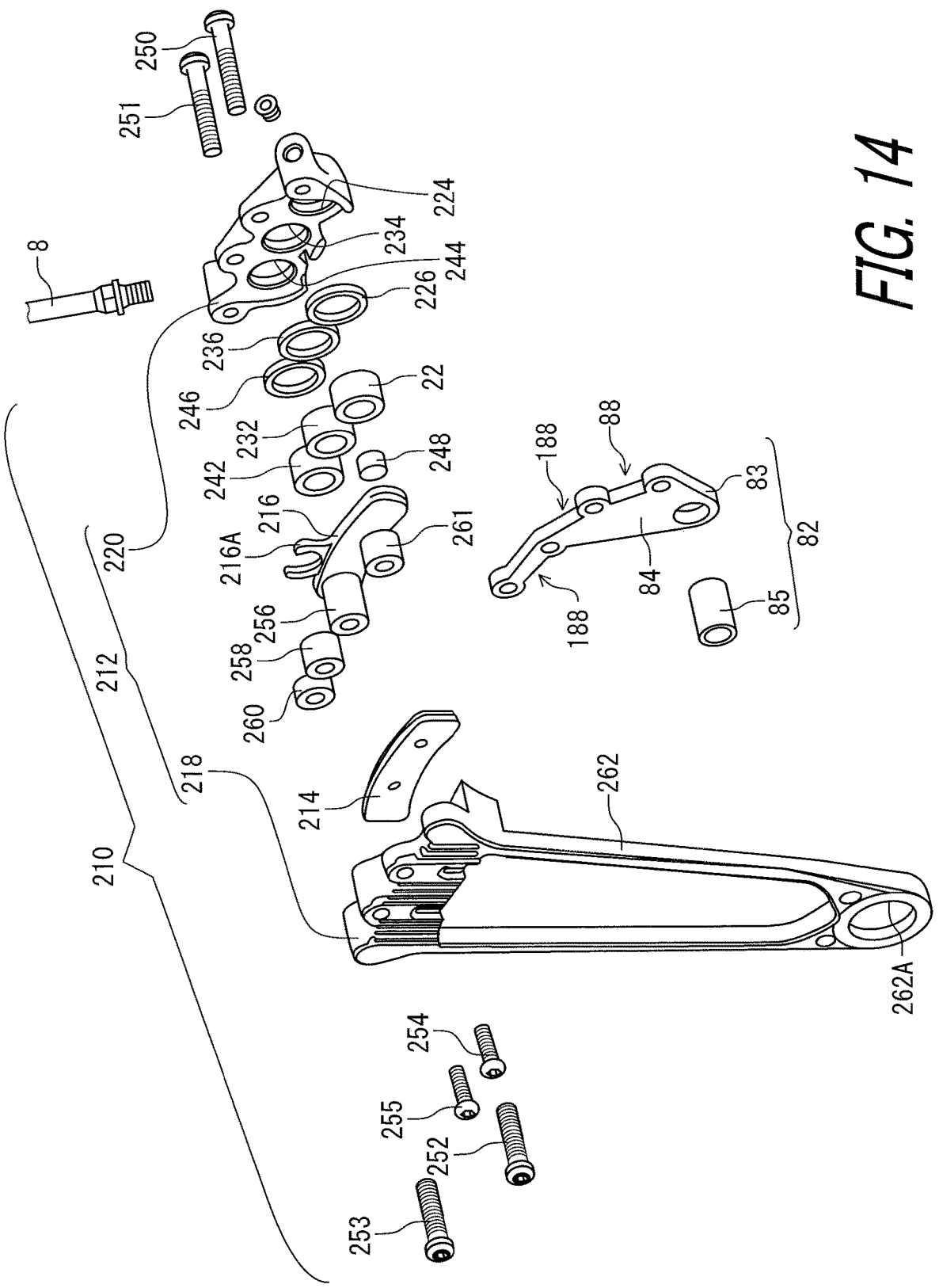
FIG. 14 is an exploded perspective view of the third disc brake caliper illustrated in FIG. 13.

As seen in FIG. 14, the disc brake caliper 210 for the human-powered vehicle 2 comprises a caliper body 212, a first brake pad 214, and a second brake pad 216. The caliper body 212 includes a first body part 218 and a second body part 220. The first brake pad 214 is coupled to the first body part 218. The second brake pad 216 is movable relative to the second body part 220.

In the present embodiment, the first brake pad 214 is secured to the first body part 218. The first brake pad 214 is separate member from the first body part 218. The first body part 218 is a separate member from the second body part 220. However, the first body part 218 can be integrally provided with the second body part 220 as a one-piece unitary member if needed and/or desired. The first brake pad 214 can be integrally provided with the first body part 218 as a one-piece unitary member if needed and/or desired. The caliper body 212 can also be referred to as a third caliper body 212.

The third caliper body 212 has substantially the same structure as the structure of the first caliper body 12 of the first disc brake caliper 10. The first body part 218 has substantially the same structure as the structure of the first body part 18 of the first disc brake caliper 10. The second body part 220 has substantially the same structure as the structure of the second body part 20 of the first disc brake caliper 10. The first brake pad 214 has substantially the same structure as the structure of the first brake pad 14 of the first disc brake caliper 10. The second brake pad 216 has substantially the same structure as the structure of the second brake pad 16 of the first disc brake caliper 10. However, the third caliper body 212 can have a structure different from the structure of the first caliper body 12 of the first disc brake caliper 10 if needed and/or desired. The first brake pad 214 can have a structure different from the structure of the first brake pad 14 of the first disc brake caliper 10 if needed and/or desired. The second brake pad 216 can have a structure different from the structure of the second brake pad 16 of the first disc brake caliper 10 if needed and/or desired.

The disc brake caliper 210 further comprises a piston 222. The third caliper body 212 includes a cylinder hole 224. The second body part 220 includes the cylinder hole 224. The piston 222 is movably provided in the cylinder hole 224. The disc brake caliper 210 further comprises a seal member 226. The seal member 226 is provided between the second body part 220 and the piston 222.

The disc brake caliper 210 further comprises a piston 232. The third caliper body 212 includes a cylinder hole 234. The second body part 220 includes the cylinder hole 234. The piston 232 is movably provided in the cylinder hole 234. The disc brake caliper 210 further comprises a seal member 236. The seal member 236 is provided between the second body part 220 and the piston 232.

The disc brake caliper 210 further comprises a piston 242. The third caliper body 212 includes a cylinder hole 244. The second body part 220 includes the cylinder hole 244. The piston 242 is movably provided in the cylinder hole 244. The disc brake caliper 210 further comprises a seal member 246. The seal member 246 is provided between the second body part 220 and the piston 242.

In the present embodiment, the disc brake caliper 210 includes the pistons 222, 232, and 242 and the seal member 226, 236, and 246. The third caliper body 212 includes the cylinder holes 224, 234, and 244. However, the disc brake caliper 210 can include at least one piston if needed and/or desired. The third caliper body 212 can include at least one cylinder hole if needed and/or desired. The disc brake caliper 210 can include at least one seal member if needed and/or desired.

The disc brake caliper 210 further comprises a magnetic body 248 coupled to the piston 222. The magnetic body 248 includes a magnet. The magnetic body 248 is secured to the piston 222 with a securing structure such as an adhesive, press-fitting, and insertion molding. The second brake pad 216 includes a magnetic material. The second brake pad 216 is magnetically attracted toward the magnetic body 248 to be moved along with the piston 222. The magnetic body 248 can be coupled to at least one of the pistons 222, 232, and 242 if needed and/or desired. In such modifications, the disc brake caliper 210 includes at least two magnetic body 248.

The disc brake caliper 210 comprises first fasteners 250 and 251, second fasteners 252 and 253, third fasteners 254 and 255, a first spacer 256, a second spacer 258, a third spacer 260, and a fourth spacer 261. The first body part 218 is secured to the second body part 220 with the first fasteners 250 and 251. The first body part 218 is secured to the second body part 220 with the second fasteners 252 and 253. Examples of each of the first fasteners 250 and 251, the second fasteners 252 and 253, and the third fasteners 254 and 255 include a screw, a rivet, and a combination of a bolt and a nut.

The first brake pad 214 is secured to the first body part 218 with the third fasteners 254 and 255. The first spacer 256, the second spacer 258, and the third spacer 260 are provided between the first body part 218 and the second body part 220 to define a space between the first body part 218 and the second body part 220. The second spacer 258 movably supports the second brake pad 216. The second brake pad 216 includes a guide portion 216A. The second brake pad 216 is movably coupled to the second spacer 258 via the guide portion 216A.

The first spacer 256 has a tubular shape. The second spacer 258 has a tubular shape. The third spacer 260 has a tubular shape. The fourth spacer 261 has a tubular shape. The first fastener 250 extends through the first spacer 256. The first fastener 251 extends through the second spacer 258. The second fastener 253 extends through the third spacer 260. The second fastener 252 extends through the fourth spacer 261.

The disc brake caliper 210 further comprises an axle mounting bracket 262. The axle mounting bracket 262 is configured to couple the caliper body 212 and the hub axle 4A of the hub assembly 4 of the human-powered vehicle 2. The axle mounting bracket 262 includes a mounting opening 262A through which the hub axle 4A of the hub assembly 4 extends. In the present embodiment, the axle mounting bracket 262 is integrally provided with the first body part 218 as a one-piece unitary member. The axle mounting bracket 262 is longer than the axle mounting bracket 62 (see e.g., FIG. 3) of the disc brake caliper 10. However, the axle mounting bracket 262 can be a separate member from the first body part 218 if needed and/or desired. The axle mounting bracket 262 can be omitted from the disc brake caliper 210 if needed and/or desired. The axle mounting bracket 262 can be shorter than the axle mounting bracket 62 (see e.g., FIG. 3) of the disc brake caliper 10 if needed and/or desired. The first body part 218 can have the structure different from the structure of the first body part 18 (see e.g., FIG. 3) of the first disc brake caliper 10 in a case where the axle mounting bracket 262 is integrally provided with the first body part 218 as a one-piece unitary member.

Figure 15:
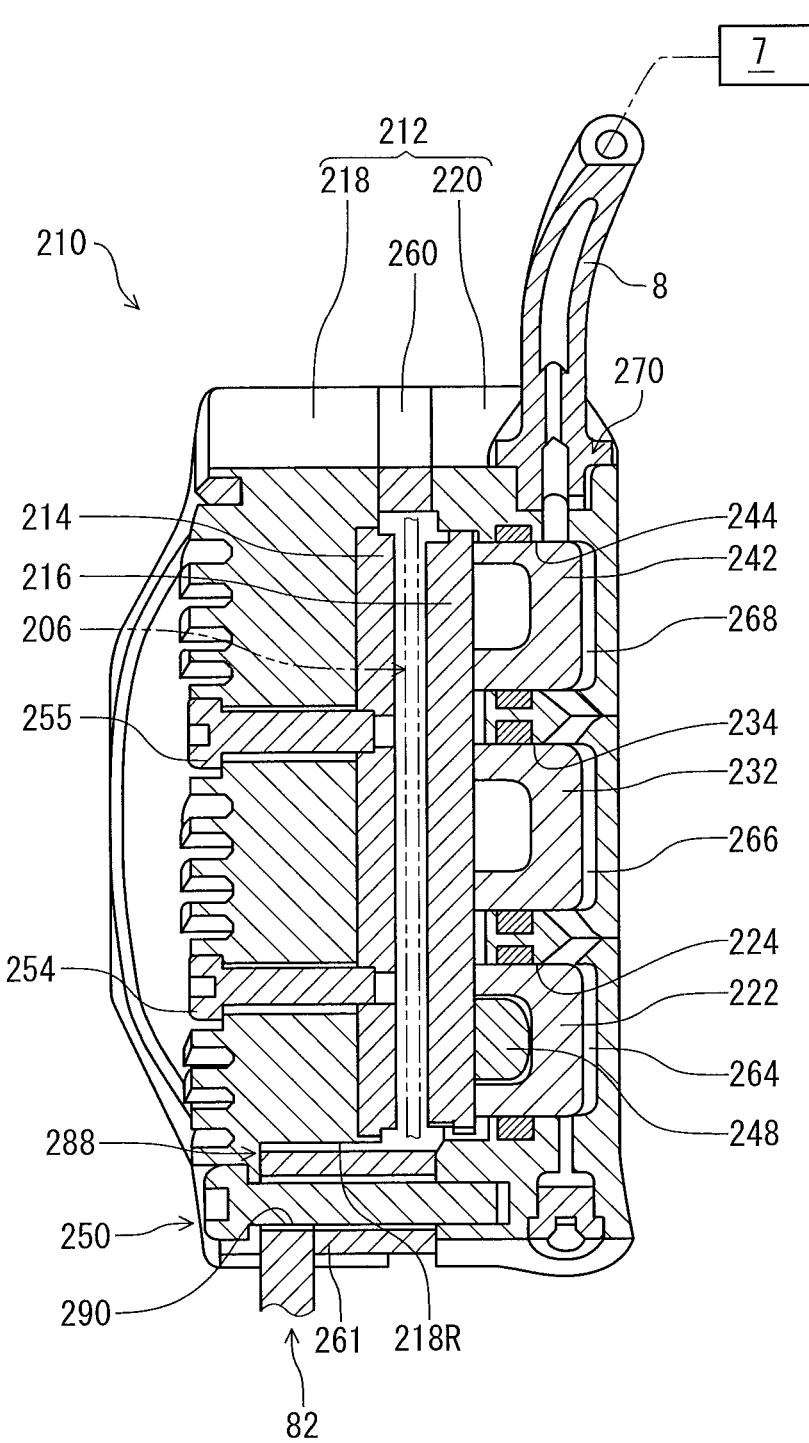
FIG. 15 is a cross-sectional view of the third disc brake caliper taken along line XIII-XIII of FIG. 13.

As seen in FIG. 15, the second body part 220 is configured to be connected to the operating device 7 via the hydraulic hose 8. The second body part 220 and the piston 222 define a hydraulic chamber 264 in the cylinder hole 224. The second body part 220 and the piston 232 define a hydraulic chamber 266 in the cylinder hole 234. The second body part 220 and the piston 242 define a hydraulic chamber 268 in the cylinder hole 244.

The second body part 220 includes a connector port 270 to which the hydraulic hose 8 is to be connected. The hydraulic chamber 268 is connected to the connector port 270. The hydraulic chamber 268 is connected to the hydraulic chamber 266. The hydraulic chamber 266 is connected to the hydraulic chamber 264. The piston 222 is moved relative to the second body part 220 toward the first body part 218 in response to a hydraulic pressure transmitted to the hydraulic chamber 264. The piston 232 is moved relative to the second body part 220 toward the first body part 218 in response to a hydraulic pressure transmitted to the hydraulic chamber 266. The piston 242 is moved relative to the second body part 220 toward the first brake pad 214 in response to a hydraulic pressure transmitted to the hydraulic chamber 268. The second brake pad 216 is moved toward the first brake pad 214 by the pistons 222, 232, and 242.

Figure 16:
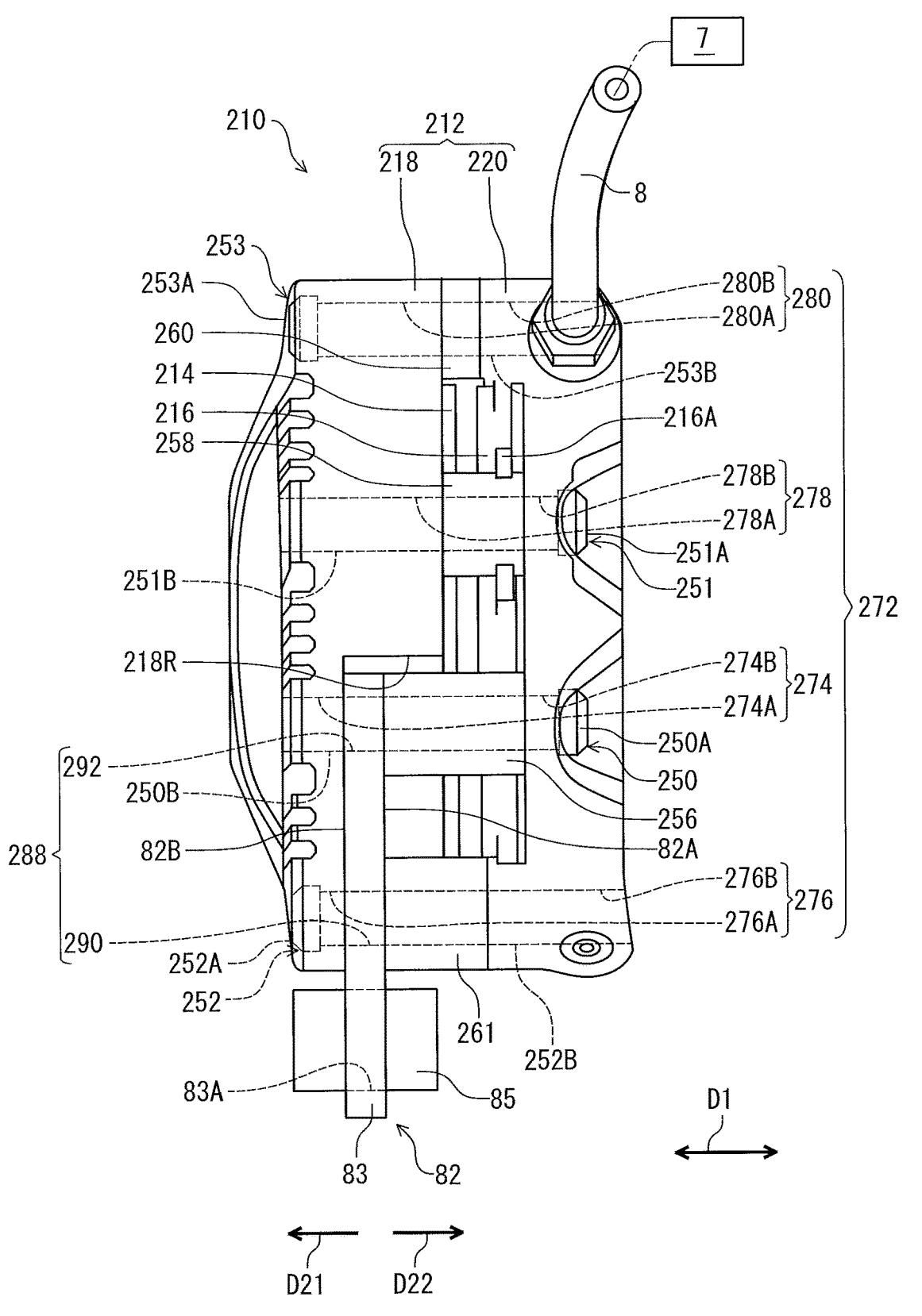
FIG. 16 is a plan view of the third disc brake caliper illustrated in FIG. 13.

As seen in FIG. 16, the third caliper body 212 includes a third caliper coupling portion 272. The third caliper coupling portion 272 includes a fifth caliper coupling hole 274 and a sixth caliper coupling hole 276. The first fastener 250 is at least partially provided in the fifth caliper coupling hole 274. The second fastener 252 is at least partially provided in the sixth caliper coupling hole 276.

The fifth caliper coupling hole 274 includes fifth coupling holes 274A and 274B. The fifth coupling hole 274A is provided to the first body part 218. The fifth coupling hole 274B is provided to the second body part 220. The fifth coupling hole 274A includes a threaded hole. The first fastener 250 includes a head part 250A and a rod part 250B. The head part 250A is provided at an end of the rod part 250B. The rod part 250B includes an externally threaded part engaged with the threaded hole of the fifth coupling hole 274A.

The sixth caliper coupling hole 276 includes sixth coupling holes 276A and 276B. The sixth coupling hole 276A is provided to the first body part 218. The sixth coupling hole 276B is provided to the second body part 220. The sixth coupling hole 276B includes a threaded hole. The second fastener 252 includes a head part 252A and a rod part 252B. The head part 252A is provided at an end of the rod part 252B. The rod part 252B includes an externally threaded part engaged with the threaded hole of the sixth coupling hole 276B.

The third caliper coupling portion 272 includes a fifth caliper coupling hole 278 and a sixth caliper coupling hole 280. The first fastener 251 is at least partially provided in the fifth caliper coupling hole 278. The second fastener 253 is at least partially provided in the sixth caliper coupling hole 280.

The fifth caliper coupling hole 278 includes fifth coupling holes 278A and 278B. The fifth coupling hole 278A is provided to the first body part 218. The fifth coupling hole 278A is provided to the second body part 220. The fifth coupling hole 278B includes a threaded hole. The first fastener 251 includes a head part 251A and a rod part 251B. The head part 251A is provided at an end of the rod part 251B. The rod part 251B includes an externally threaded part engaged with the threaded hole of the fifth coupling hole 278A.

The sixth caliper coupling hole 280 includes sixth coupling holes 280A and 280B. The sixth coupling hole 280A is provided to the second body part 220. The sixth coupling hole 280B is provided to the first body part 218. The sixth coupling hole 280B includes a threaded hole. The second fastener 253 includes a head part 253A and a rod part 253B. The head part 253A is provided at an end of the rod part 253B. The rod part 253B includes an externally threaded part engaged with the threaded hole of the sixth coupling hole 280B.

The first caliper part 218 includes a recess 218R. The caliper adaptor 82 is at least partially provided in the recess 218R. To avoid interference between the caliper adaptor 82 and the disc brake rotor 206, the caliper adaptor 82 is offset from the disc brake rotor 206 in the axial direction D1.

As seen in FIG. 13, the disc brake caliper 210 for the human-powered vehicle 2 comprises the caliper adaptor 82. The caliper adaptor 82 is coupled to the third caliper body 212. The caliper adaptor 82 is configured to couple the third caliper body 212 and the vehicle body 3. The third caliper body 212 is mounted to the vehicle body 3 via the caliper adaptor 82.

The caliper adaptor 82 further comprises a third coupling portion 288. The adaptor body 84 includes the third coupling portion 288. The third coupling portion 288 is configured to be coupled to the third caliper body 212 in a third state where the third caliper body 212 is in a third radial position P3 relative to the rotational axis RA. The third coupling portion 288 of the caliper adaptor 82 is configured to be coupled to the third caliper coupling portion 272 in the third state. The third coupling portion 288 of the caliper adaptor 82 is configured to be coupled to the fifth caliper coupling hole 274 and the sixth caliper coupling hole 276 in the third state.

In the present embodiment, the third radial position P3 is defined based on the fifth caliper coupling hole 274 and the sixth caliper coupling hole 276 in the second state. However, the third radial position P3 can be defined based on portions other than the fifth caliper coupling hole 274 and the sixth caliper coupling hole 276 if needed and/or desired.

In the present embodiment, the third coupling portion 288 is provided radially outwardly of the frame coupling portion 83 in a third coupling state where the frame coupling portion 83 is coupled to the protruding portion 3B and where the third coupling portion 288 is coupled to the third caliper body 212. However, the third coupling portion 288 can be provided radially inwardly of the frame coupling portion 83 in the third coupling state if needed and/or desired. The third coupling portion 288 can be omitted from the caliper adaptor 82 if needed and/or desired.

As seen in FIG. 8, the third coupling portion 288 includes a third hole 290. The third coupling portion 288 includes a third additional hole 292. The third additional hole 292 is spaced apart from the third hole 290. The third hole 290 is spaced apart from the frame coupling hole 83A. The third additional hole 292 is spaced apart from the frame coupling hole 83A. The third hole 290 is provided closer to the frame coupling hole 83A than the third additional hole 292. The third hole 290 and the third additional hole 292 are provided radially outwardly of the frame coupling portion 83 in a third coupling state where the frame coupling portion 83 is coupled to the protruding portion 3B and where the third coupling portion 288 is coupled to the third caliper body 212. However, the third additional hole 292 can be provided closer to the frame coupling hole 83A than the third hole 290 if needed and/or desired. A distance defined between the third hole 290 and the frame coupling hole 83A can be equal to a distance between the third additional hole 292 and the frame coupling hole 83A if needed and/or desired.

As seen in FIG. 16, the caliper adaptor 82 is at least partially provided between the first body part 218 and the second body part 220. The caliper adaptor 82 and the first spacer 256 are at least partially provided between the first body part 218 and the second body part 220. The caliper adaptor 82 is at least partially provided between the first body part 218 and the first spacer 256. In the present embodiment, the caliper adaptor 82 is partially provided between the first body part 218 and the second body part 220. The first spacer 256 is entirely provided between the first body part 218 and the second body part 220. The caliper adaptor 82 is partially provided between the first body part 218 and the first spacer 256. However, the caliper adaptor 82 can be entirely provided between the first body part 218 and the second body part 220 if needed and/or desired. The first spacer 256 can be partially provided between the first body part 218 and the second body part 220 if needed and/or desired. The caliper adaptor 82 can be entirely provided between the first body part 218 and the first spacer 256 if needed and/or desired.

The third coupling portion 288 is at least partially provided between the first body part 218 and the second body part 220. The third coupling portion 288 and the first spacer 256 are at least partially provided between the first body part 218 and the second body part 220. The third coupling portion 288 is at least partially provided between the first body part 218 and the first spacer 256. In the present embodiment, the third coupling portion 288 is partially provided between the first body part 218 and the second body part 220. The first spacer 256 is entirely provided between the first body part 218 and the second body part 220. The third coupling portion 288 is partially provided between the first body part 218 and the first spacer 256. However, the third coupling portion 288 can be entirely provided between the first body part 218 and the second body part 220 if needed and/or desired. The first spacer 256 can be partially provided between the first body part 218 and the second body part 220 if needed and/or desired. The third coupling portion 288 can be entirely provided between the first body part 218 and the first spacer 256 if needed and/or desired.

The third coupling portion 288 extends in the axial direction D1 in the third state. The third hole 290 extends in the axial direction D1 in the third state. The third additional hole 292 extends in the axial direction D1 in the third state.

The third coupling portion 288 is configured to be coupled to the third caliper body 212 in the third state via the third hole 290. The third hole 290 corresponds to the sixth caliper coupling hole 276. The third additional hole 292 is coaxially provided with the sixth caliper coupling hole 276 in the third state. The third hole 290 is provided between the sixth coupling holes 276A and 276B in the third state. The second fastener 252 extends through the third hole 290 in the third state.

The third coupling portion 288 is configured to be coupled to the third caliper body 212 in the third state via the third hole 290 and the third additional hole 292. The third additional hole 292 corresponds to the fifth caliper coupling hole 274. The third additional hole 292 is coaxially provided with the fifth caliper coupling hole 274 in the third state. The third additional hole 292 is provided between the fifth coupling holes 274A and 274B in the third state. The first fastener 250 extends through the third additional hole 292 in the third state.

As seen in FIGS. 6, 9, and 13, the third radial position P3 is different from each of the first radial position P1 and the second radial position P2. The third radial position P3 is provided radially outwardly of each of the first radial position P1 and the second radial position P2. The third radial position P3 is provided farther from the rotational axis RA than each of the first radial position P1 and the second radial position P2. However, the third radial position P3 can be provided radially inwardly of at least one of the first radial position P1 and the second radial position P2 if needed and/or desired. The third radial position P3 can be provided closer to the rotational axis RA than at least one of the first radial position P1 and the second radial position P2 if needed and/or desired.

As seen in FIG. 6, the first caliper coupling portion 72 has a first pattern. The first caliper coupling hole 74 and the second caliper coupling hole 76 define the first pattern. As seen in FIG. 9, the second caliper coupling portion 172 has a second pattern. The third caliper coupling hole 174 and the fourth caliper coupling hole 176 define the second pattern. As seen in FIG. 13, the third caliper coupling portion 272 has a third pattern. The fifth caliper coupling hole 274 and the sixth caliper coupling hole 276 are arranged in the third pattern.

As seen in FIGS. 6, 9, and 13, the first pattern is identical to the second pattern. The first pattern is identical to the second pattern and the third pattern. The second pattern is identical to the third pattern. However, at least one of the first pattern, the second pattern, and the third pattern can be different from another of the first pattern, the second pattern, and the third pattern if needed and/or desired.

A position of the first caliper coupling hole 74 in the first state (FIG. 6) is the same as a position of the third caliper coupling hole 174 in the second state (FIG. 9) when viewed along the rotational axis RA. The position of the first caliper coupling hole 74 in the first state (FIG. 6) is the same as a position of the fifth caliper coupling hole 274 in the third state (FIG. 13) when viewed along the rotational axis RA. The position of the third caliper coupling hole 174 in the second state (FIG. 9) is the same as a position of the fifth caliper coupling hole 274 in the third state (FIG. 13) when viewed along the rotational axis RA.

A position of the second caliper coupling hole 76 in the first state (FIG. 6) is the same as a position of the fourth caliper coupling hole 176 in the second state (FIG. 9) when viewed along the rotational axis RA. The position of the second caliper coupling hole 76 in the first state (FIG. 6) is the same as a position of the sixth caliper coupling hole 276 in the third state (FIG. 13) when viewed along the rotational axis RA. The position of the fourth caliper coupling hole 176 in the second state (FIG. 9) is the same as a position of the sixth caliper coupling hole 276 in the third state (FIG. 13) when viewed along the rotational axis RA.

At least one of the positions of the first caliper coupling hole 74, the third caliper coupling hole 174, and the fifth caliper coupling hole 274 can be different from another of the positions of the first caliper coupling hole 74, the third caliper coupling hole 174, and the fifth caliper coupling hole 274 viewed along the rotational axis RA if needed and/or desired. At least one of the positions of the second caliper coupling hole 76, the fourth caliper coupling hole 176, and the sixth caliper coupling hole 276 can be different from another of the positions of the second caliper coupling hole 76, the fourth caliper coupling hole 176, and the sixth caliper coupling hole 276 viewed along the rotational axis RA if needed and/or desired.

As seen in FIG. 8, the first hole 90 and the second hole 190 constitute a single hole. The second additional hole 192 and the third hole 290 constitute a single hole. However, the first hole 90 can be a separate hole spaced apart from the second hole 190 if needed and/or desired. The second additional hole 192 can be a separate hole spaced apart from the third hole 290 if needed and/or desired.

The frame coupling hole 83A has a frame-coupling center axis A0. The first hole 90 has a first center axis A11. The first additional hole 92 has a first additional center axis A12. The second hole 190 has a second center axis A21. The second additional hole 192 has a second additional center axis A22. The third hole 290 has a third center axis A31. The third additional hole 292 has a third additional center axis A32. In the present embodiment, the first center axis A11 coincides with the second center axis A21. The second additional center axis A22 coincides with the third center axis A31. However, the first center axis A11 can be offset from the second center axis A21 if needed and/or desired. The second additional center axis A22 can be offset from the third center axis A31 if needed and/or desired.

A first distance DS11 is defined between the first center axis A11 and the first additional center axis A12 as viewed along the first center axis A11. A second distance DS21 is defined between the second center axis A21 and the second additional center axis A22 as viewed along the second center axis A21. A third distance DS31 is defined between the third center axis A31 and the third additional center axis A32.

In the present embodiment, the first distance DS11 is equal to the second distance DS21. The third distance DS31 is equal to at least one of the first distance DS11 and second distance DS21. The third distance DS31 is equal to each of the first distance DS11 and the second distance DS21. However, the third distance DS31 can be different from at least one of the first distance DS11 and the second distance DS21 if needed and/or desired. The first distance DS11 can be different from the second distance DS21 if needed and/or desired.

A first additional distance DS12 is defined between the first center axis A11 and the frame-coupling center axis A0. A second additional distance DS22 is defined between the second center axis A21 and the frame-coupling center axis A0. A third additional distance DS32 is defined between the third center axis A31 and the frame-coupling center axis A0.

In the present embodiment, the first additional distance DS12 is equal to the second additional distance DS22. The third additional distance DS32 is longer than the first additional distance DS12 and the second additional distance DS22. The first distance DS11 is shorter than the first additional distance DS12. The second distance DS21 is shorter than the second additional distance DS22. The third distance DS31 is shorter than the third additional distance DS32. However, the first additional distance DS12 can be different from the second additional distance DS22 if needed and/or desired. The first distance DS11 can be equal to or longer than the first additional distance DS12 if needed and/or desired. The second distance DS21 can be equal to or longer than the second additional distance DS22 if needed and/or desired. The third distance DS31 can be equal to or longer than the third additional distance DS32 if needed and/or desired.

As seen in FIG. 5, the caliper adaptor 82 further comprises a first surface 82A. The caliper adaptor 82 further comprises a second surface 82B. The second surface 82B is provided on a reverse side of the first surface 82A.

The first surface 82A faces in a first direction D21 in the first coupling state where the frame coupling portion 83 is coupled to the protruding portion 3B and where the first coupling portion 88 is coupled to the first caliper body 12. The second surface 82B faces in a second direction D22 in the first coupling state. The second direction D22 is an opposite direction of the first direction D21.

As seen in FIG. 12, the first surface 82A faces in one of the first direction D21 and the second direction D22 in the second coupling state where the frame coupling portion 83 is coupled to the protruding portion 3B and where the second coupling portion 188 is coupled to the second caliper body 112. In the present embodiment, the first surface 82A faces in the first direction D21 in the second coupling state. However, the first surface 82A can be arranged to face in the second direction D22 in the second coupling state if needed and/or desired.

As seen in FIG. 16, the first surface 82A faces in one of the first direction D21 and the second direction D22 in the third coupling state where the frame coupling portion 83 is coupled to the protruding portion 3B and where the third coupling portion 288 is coupled to the third caliper body 212. In the present embodiment, the first surface 82A faces in the second direction D22 in the third coupling state. However, the first surface 82A can be arranged to face in the first direction D21 in the third coupling state if needed and/or desired.

Figure 17:
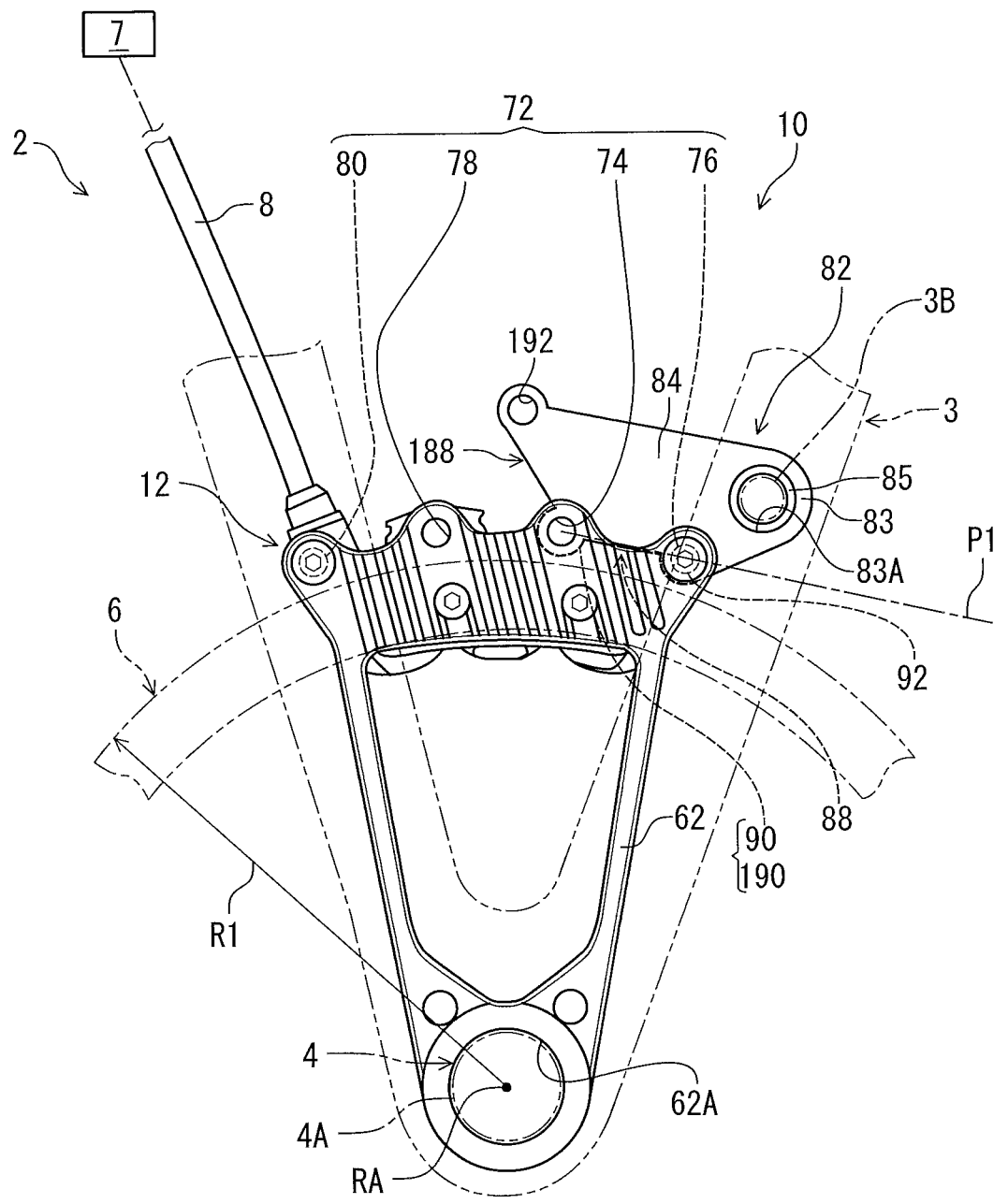
FIG. 17 is a side elevational view of the first disc brake caliper in accordance with a modification of the first embodiment.
Figure 18:
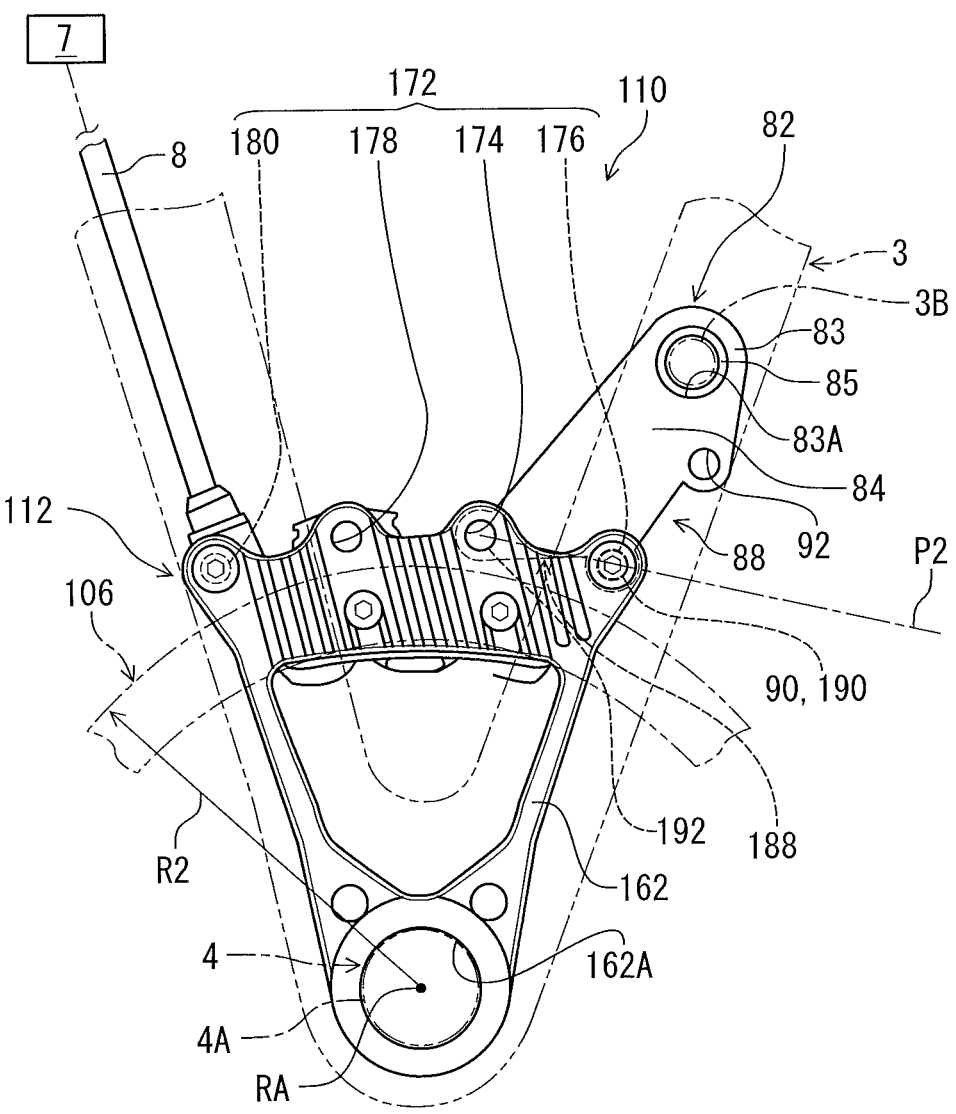
FIG. 18 is a side elevational view of the second disc brake caliper in accordance with a modification of the first embodiment.
Figure 19:
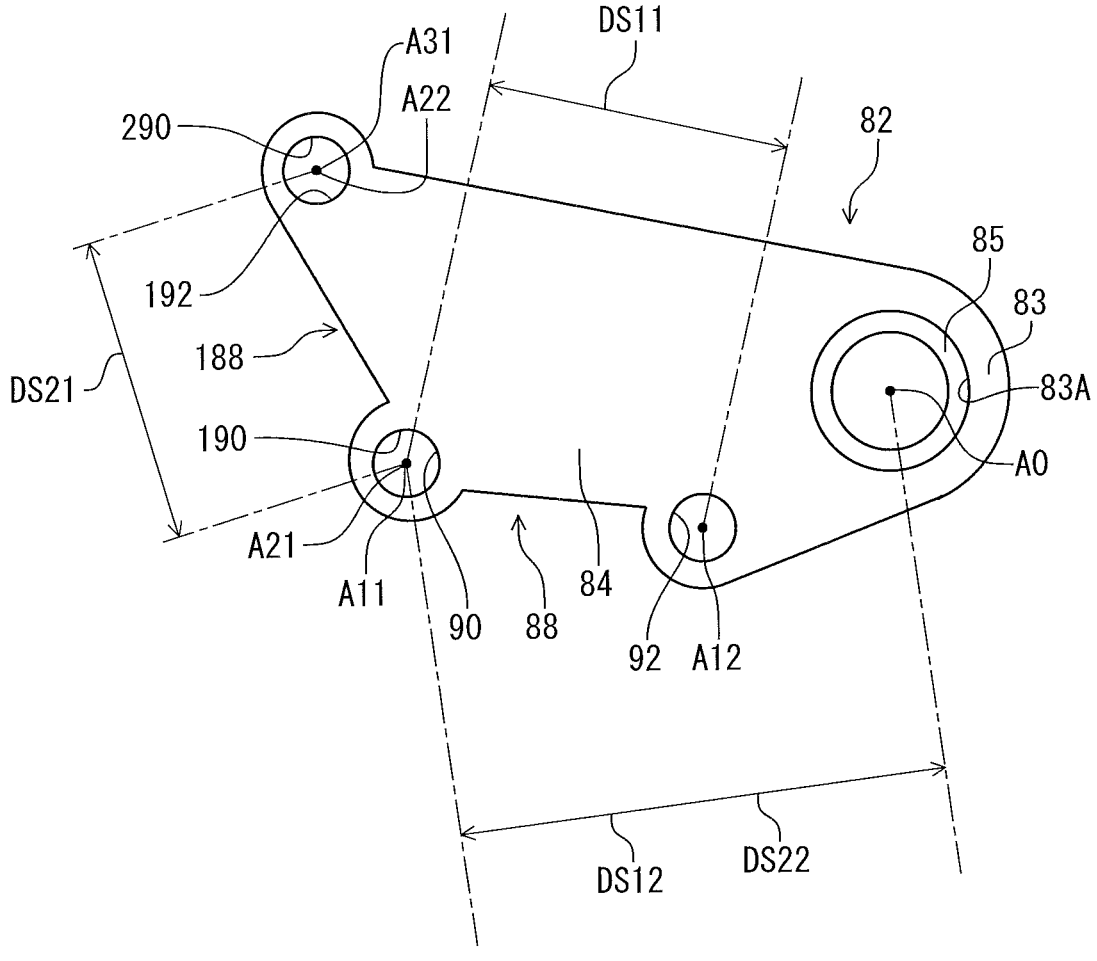
FIG. 19 is a side elevational view of a caliper adaptor of the first disc brake caliper illustrated in FIG. 17.

In the present embodiment, as seen in FIG. 8, the caliper adaptor 82 includes the third coupling portion 288. As seen in FIGS. 17 to 19, however, the third coupling portion 288 can be omitted from the caliper adaptor 82.

In the present embodiment, as seen in FIG. 8, the caliper adaptor 82 includes the first coupling portion 88 and second coupling portion 188. However, the first coupling portion 88 and second coupling portion 188 can be omitted from the caliper adaptor 82.

Second Embodiment

A disc brake caliper 310 including a caliper adaptor 382 in accordance with a second embodiment will be described below referring to FIGS. 20 to 24. The disc brake caliper 310 has the same structure and/or configuration as those of the disc brake caliper 10 except for the caliper adaptor 382. Thus, elements having substantially the same function as those in the first embodiment will be numbered the same here and will not be described and/or illustrated again in detail here for the sake of brevity.

Figure 20:
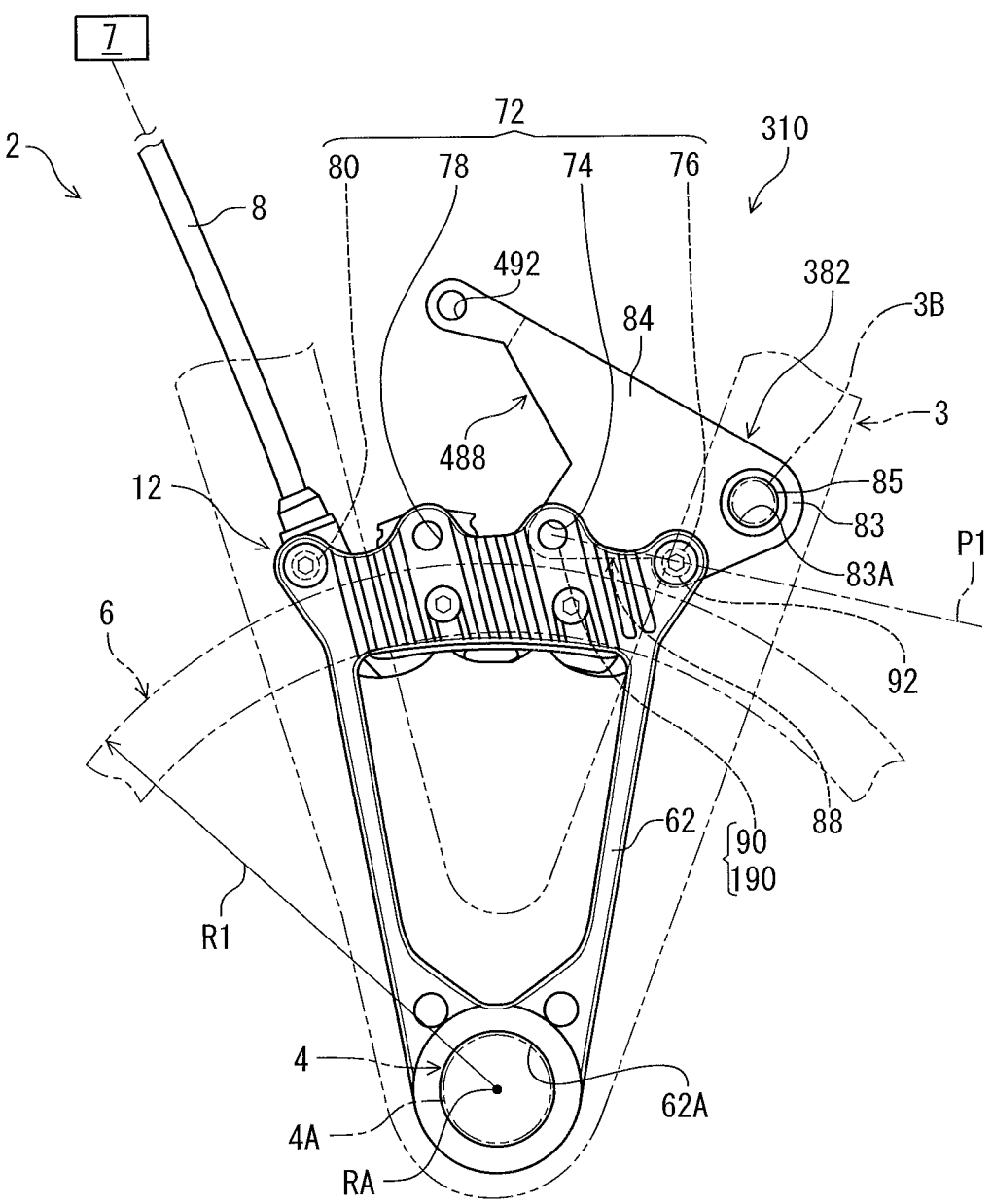
FIG. 20 is a side elevational view of a first disc brake caliper in accordance with a second embodiment.

As seen in FIG. 20, the disc brake caliper 310 has the same structure as the structure of the disc brake caliper 10 except for the caliper adaptor 382. The disc brake caliper 310 for the human-powered vehicle 2 comprises the caliper adaptor 382. The caliper adaptor 382 is coupled to the first caliper body 12. The caliper adaptor 382 is configured to couple the first caliper body 12 and the vehicle body 3. The first caliper body 12 is mounted to the vehicle body 3 via the caliper adaptor 382.

The caliper adaptor 382 for the disc brake caliper 310 of the human-powered vehicle 2 comprises the frame coupling portion 83. The caliper adaptor 382 further comprises the sleeve 85.

The caliper adaptor 382 for the disc brake caliper 310 of the human-powered vehicle 2 comprises the first coupling portion 88. The adaptor body 84 includes the first coupling portion 88. The first coupling portion 88 is configured to be coupled to the first caliper body 12 of the disc brake caliper 310 in the first state where the first caliper body 12 is in the first radial position P1 relative to the rotational axis RA. The first coupling portion 88 of the caliper adaptor 382 is configured to be coupled to the first caliper coupling portion 72 in the first state. The first coupling portion 88 of the caliper adaptor 382 is configured to be coupled to the first caliper coupling hole 74 and the second caliper coupling hole 76 in the first state.

Figure 21:
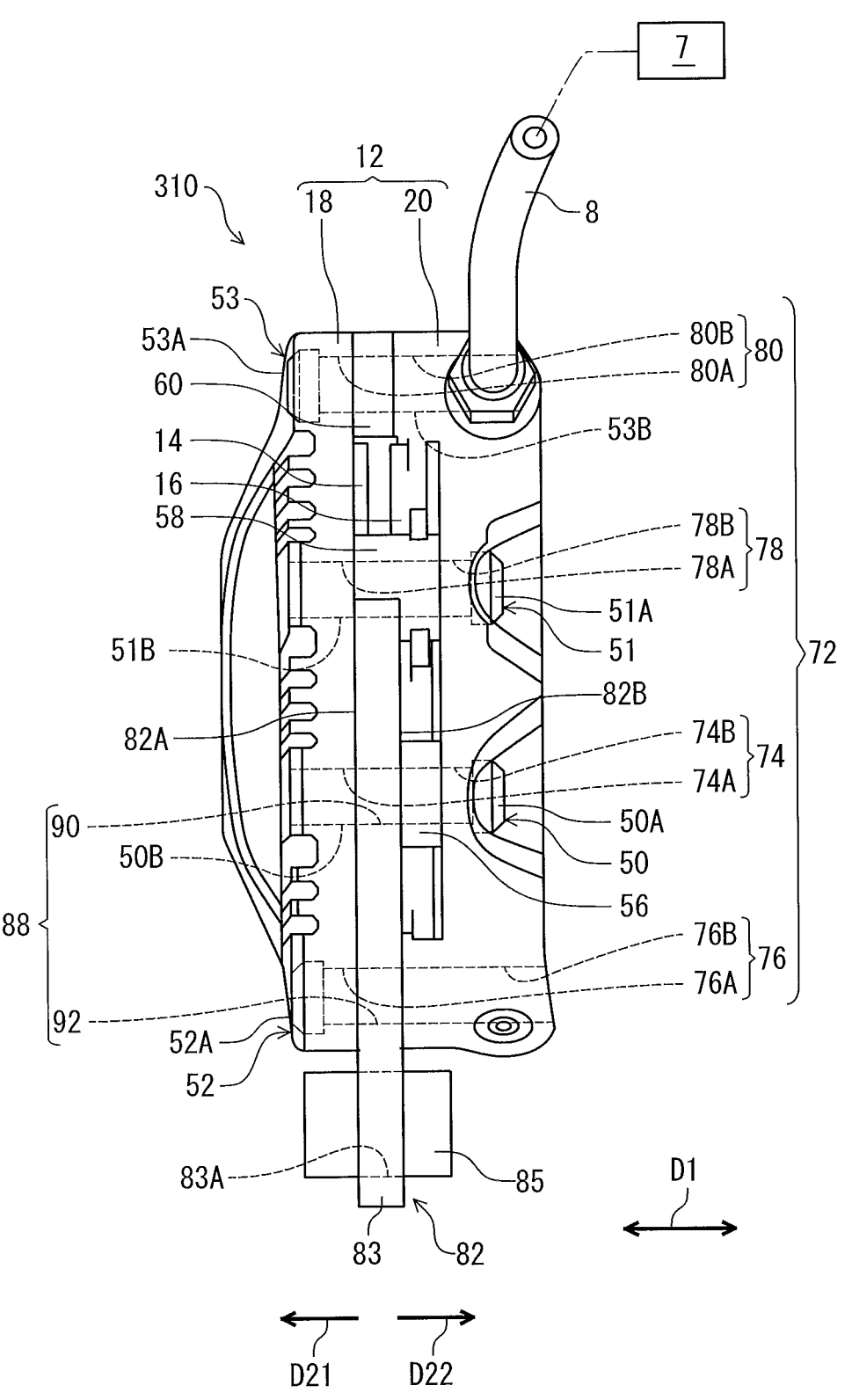
FIG. 21 is a plan view of the first disc brake caliper illustrated in FIG. 20.

As seen in FIG. 21, the caliper adaptor 382 is at least partially provided between the first body part 18 and the second body part 20. The caliper adaptor 382 and the first spacer 56 are at least partially provided between the first body part 18 and the second body part 20. The caliper adaptor 382 is at least partially provided between the first body part 18 and the first spacer 56. In the present embodiment, the caliper adaptor 382 is partially provided between the first body part 18 and the second body part 20. The first spacer 56 is entirely provided between the first body part 18 and the second body part 20. The caliper adaptor 382 is partially provided between the first body part 18 and the first spacer 56. However, the caliper adaptor 382 can be entirely provided between the first body part 18 and the second body part 20 if needed and/or desired. The first spacer 56 can be partially provided between the first body part 18 and the second body part 20 if needed and/or desired. The caliper adaptor 382 can be entirely provided between the first body part 18 and the first spacer 56 if needed and/or desired.

Figure 22:
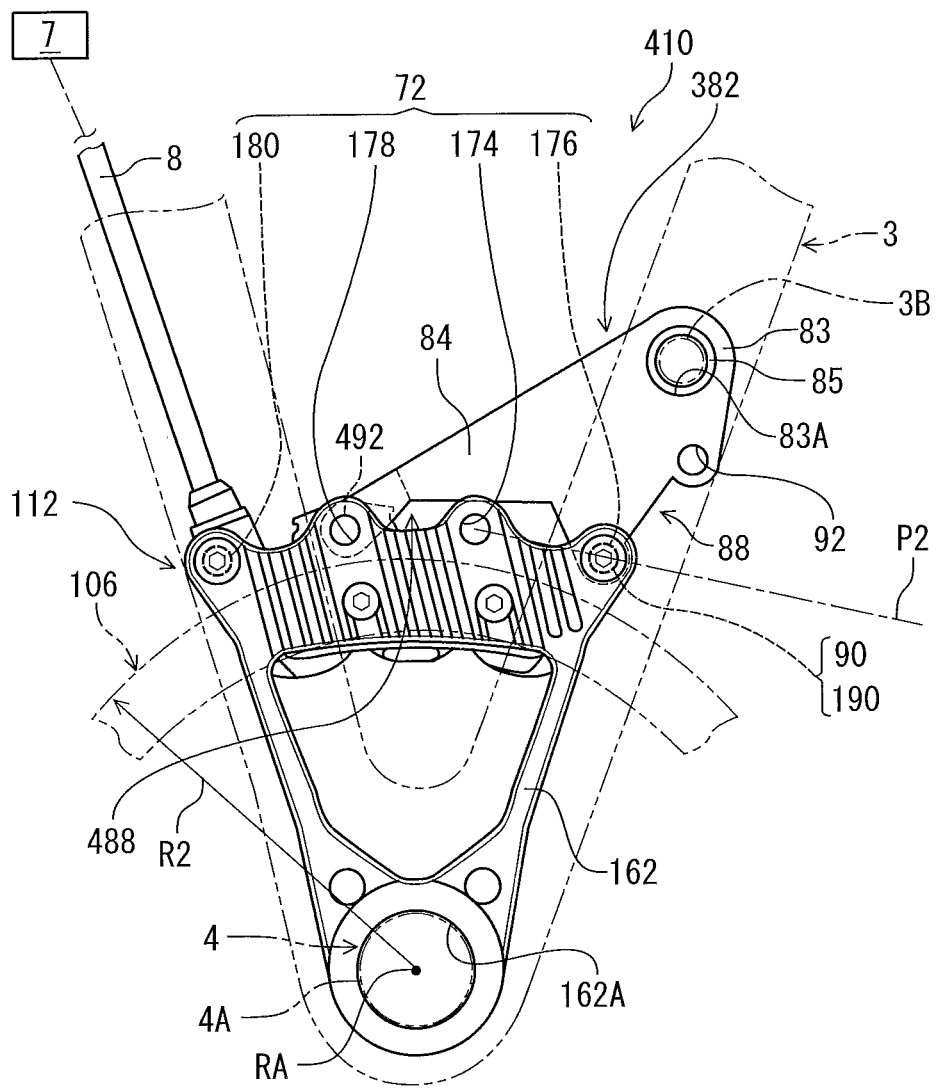
FIG. 22 is a side elevational view of a second disc brake caliper in accordance with the second embodiment.

As seen in FIG. 22, a disc brake caliper 410 has the same structure as the structure of the disc brake caliper 210 except for the caliper adaptor 382. The disc brake caliper 410 for the human-powered vehicle 2 comprises the caliper body 112, the first brake pad 114, and the second brake pad 116. The caliper adaptor 382 is coupled to the first caliper body 212. The caliper adaptor 382 is configured to couple the first caliper body 212 and the vehicle body 3. The first caliper body 212 is mounted to the vehicle body 3 via the caliper adaptor 382.

The disc brake caliper 410 for the human-powered vehicle 2 comprises the caliper adaptor 382. The caliper adaptor 382 is coupled to the second caliper body 112. The caliper adaptor 382 is configured to couple the second caliper body 112 and the vehicle body 3. The second caliper body 112 is mounted to the vehicle body 3 via the caliper adaptor 382.

The caliper adaptor 382 for the disc brake caliper 410 of the human-powered vehicle 2 comprises a second coupling portion 488. The adaptor body 84 includes the second coupling portion 488. The second coupling portion 488 is configured to be coupled to the second caliper body 112 in the second state where the second caliper body 112 is in the second radial position P2 relative to the rotational axis RA. The second coupling portion 488 of the caliper adaptor 382 is configured to be coupled to the second caliper coupling portion 172 in the second state. The second coupling portion 488 of the caliper adaptor 382 is configured to be coupled to the third caliper coupling hole 174 and the fourth caliper coupling hole 176 in the second state.

Figure 23:
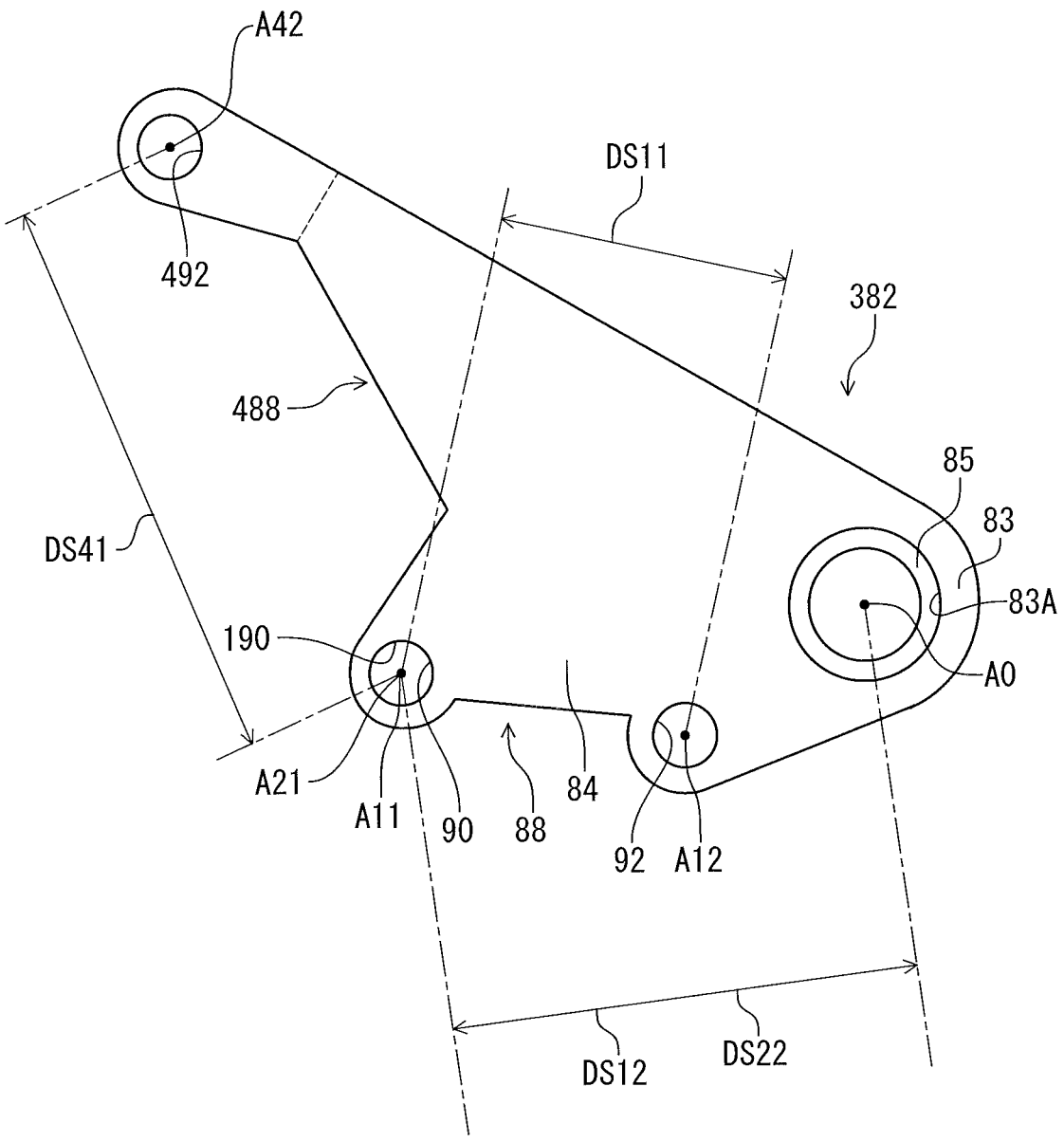
FIG. 23 is a side elevational view of a caliper adaptor of the first disc brake caliper illustrated in FIG. 20.

As seen in FIG. 23, the second coupling portion 488 includes the second hole 190. The second coupling portion 488 includes a second additional hole 492. The second additional hole 492 is spaced apart from the second hole 190. The second hole 190 is spaced apart from the frame coupling hole 83A. The second additional hole 492 is spaced apart from the frame coupling hole 83A. The second hole 190 is provided closer to the frame coupling hole 83A than the second additional hole 492. However, the second additional hole 492 can be provided closer to the frame coupling hole 83A than the second hole 190 if needed and/or desired. A distance defined between the second hole 190 and the frame coupling hole 83A can be equal to a distance between the second additional hole 492 and the frame coupling hole 83A if needed and/or desired.

Figure 24:
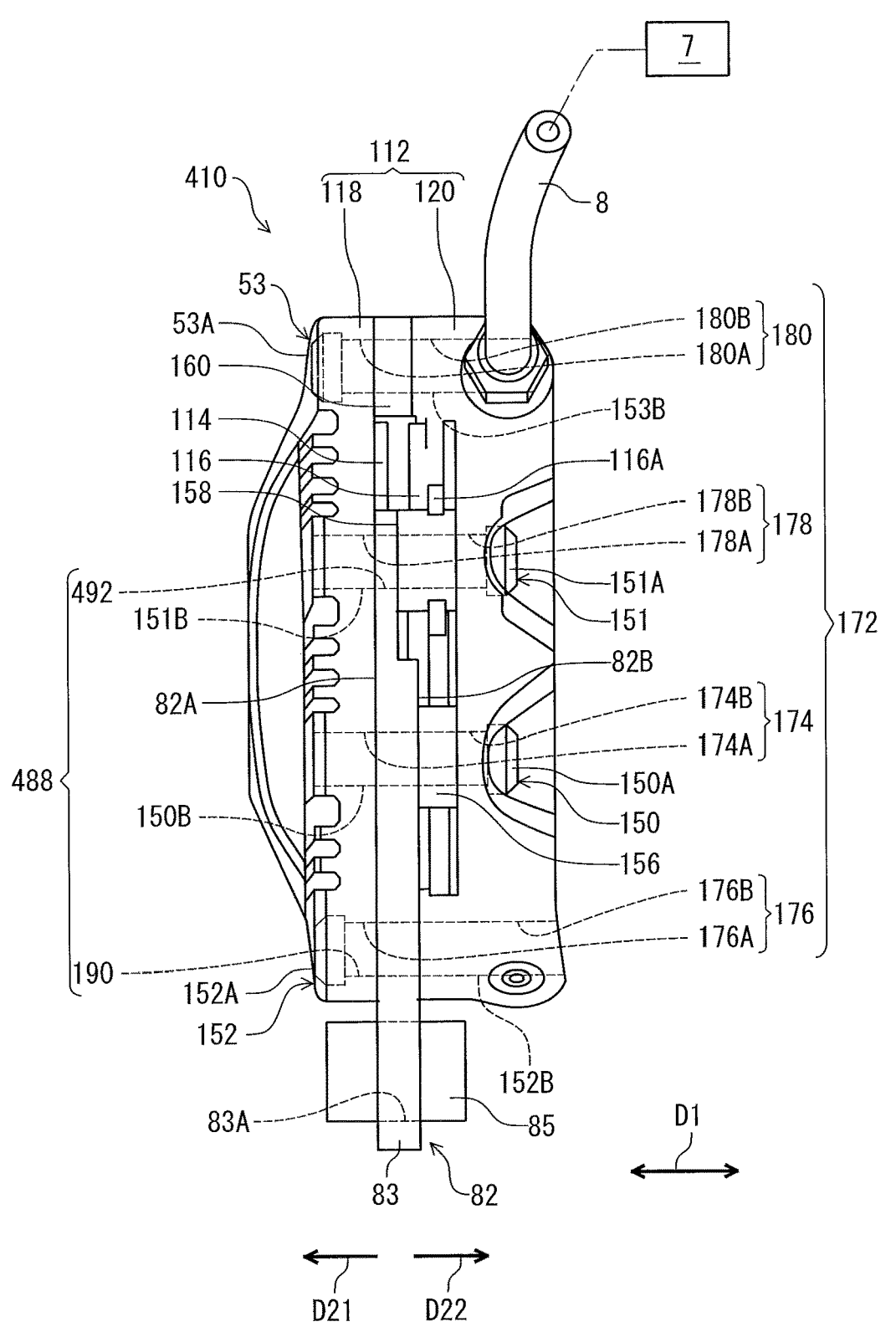
FIG. 24 is a plan view of the second disc brake caliper illustrated in FIG. 22.
Figure 25:
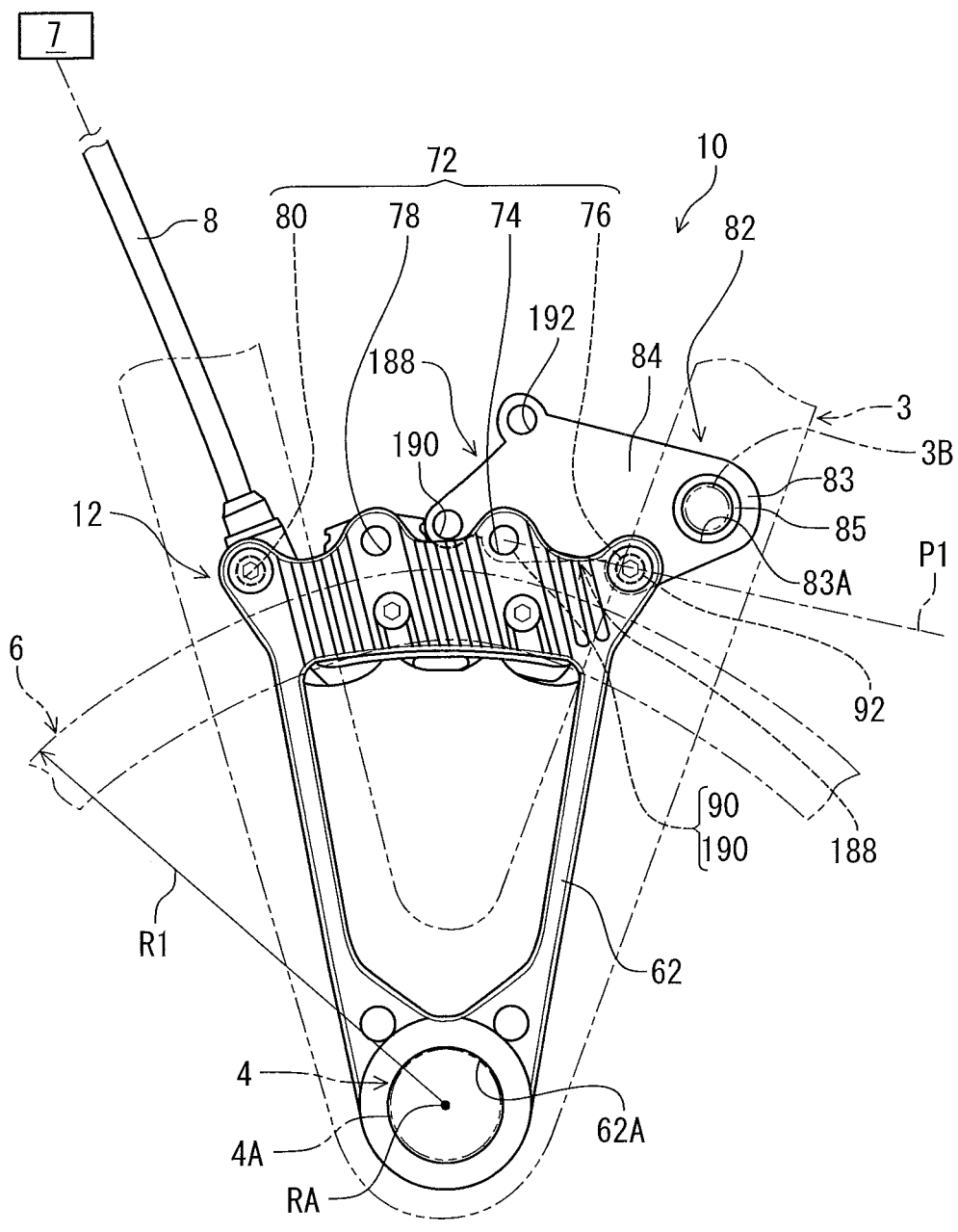
FIG. 25 is a side elevational view of the first disc brake caliper in accordance with a modification of the first embodiment.
Figure 26:
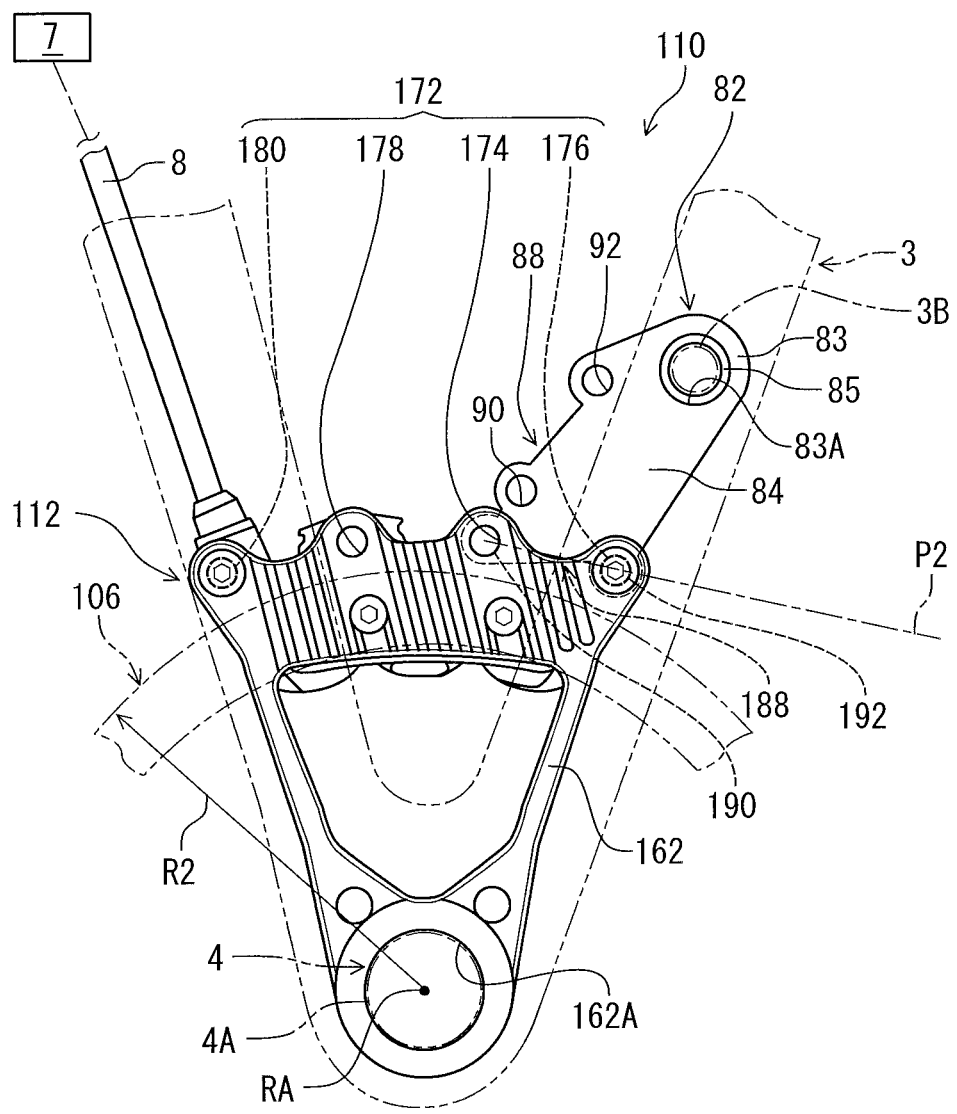
FIG. 26 is a side elevational view of the second disc brake caliper in accordance with a modification of the first embodiment.

As seen in FIG. 24, the caliper adaptor 382 is provided between the first body part 118 and the second body part 120. The caliper adaptor 382 and the first spacer 156 are provided between the first body part 118 and the second body part 120. The caliper adaptor 382 is provided between the first body part 118 and the first spacer 156.

The second coupling portion 488 is provided between the first body part 118 and the second body part 120. The second coupling portion 488 and the first spacer 156 are provided between the first body part 118 and the second body part 120. The second coupling portion 488 is provided between the first body part 118 and the first spacer 156.

The second coupling portion 488 extends in the axial direction D1 in the second state. The second hole 190 extends in the axial direction D1 in the second state. The second additional hole 492 extends in the axial direction D1 in the second state.

The second coupling portion 488 is configured to be coupled to the second caliper body 112 in the second state via the second hole 190. The second hole 190 corresponds to the fourth caliper coupling hole 176. The second hole 190 is coaxially provided with the fourth caliper coupling hole 176 in the second state. The second hole 190 is provided between the fourth coupling holes 176A and 176B in the second state. The second fastener 152 extends through the second hole 190 in the second state.

The second coupling portion 488 is configured to be coupled to the second caliper body 112 in the second state via the second hole 190 and the second additional hole 492. The second additional hole 492 corresponds to the third caliper coupling hole 178. The second additional hole 492 is coaxially provided with the third caliper coupling hole 178 in the second state. The second additional hole 492 is provided between the third coupling holes 178A and 178B in the second state. The first fastener 151 extends through the second additional hole 492 in the second state.

As seen in FIG. 23, the second hole 190 has the second center axis A21. The second additional hole 492 has a second additional center axis A42. A second distance DS41 is defined between the second center axis A21 and the second additional center axis A42 as viewed along the second center axis A21.

In the present embodiment, the first distance DS11 is different from the second distance DS41. The second distance DS41 is longer than the first distance DS11. However, the second distance DS41 can be equal to or shorter than the first distance DS11 if needed and/or desired.

As seen in FIG. 21, the caliper adaptor 382 further comprises the first surface 82A. The caliper adaptor 382 further comprises the second surface 82B. The first surface 82A faces in the first direction D21 in the first coupling state where the frame coupling portion 83 is coupled to the protruding portion 3B and where the first coupling portion 88 is coupled to the first caliper body 12. The second surface 82B faces in the second direction D22 in the first coupling state.

As seen in FIG. 24, the first surface 82A faces in one of the first direction D21 and the second direction D22 in the second coupling state where the frame coupling portion 83 is coupled to the protruding portion 3B and where the second coupling portion 488 is coupled to the second caliper body 112. In the present embodiment, the first surface 82A faces in the first direction D21 in the second coupling state. However, the first surface 82A can be arranged to face in the second direction D22 in the second coupling state if needed and/or desired.

As seen in FIG. 20, as with the first embodiment, the first caliper coupling portion 72 has the first pattern. The first caliper coupling hole 74 and the second caliper coupling hole 76 define the first pattern. As seen in FIG. 22, the second caliper coupling portion 172 has a second pattern. In the second embodiment, the third caliper coupling hole 178 and the fourth caliper coupling hole 176 define the second pattern. Thus, the second pattern in the second embodiment is different from the second pattern in the first embodiment.

As seen in FIGS. 20 and 22, in the second embodiment, the first pattern is different from the second pattern. The position of the first caliper coupling hole 74 in the first state (FIG. 20) is different from the position of the third caliper coupling hole 178 in the second state (FIG. 22) when viewed along the rotational axis RA. The position of the second caliper coupling hole 76 in the first state (FIG. 20) is the same as the position of the fourth caliper coupling hole 176 in the second state (FIG. 22) when viewed along the rotational axis RA. However, the first pattern can be identical to the second pattern if needed and/or desired.

In the present embodiment, as seen in FIG. 23, the caliper adaptor 382 includes the first coupling portion 88. However, the first coupling portion 88 can be omitted from the caliper adaptor 82.

Figure 27:
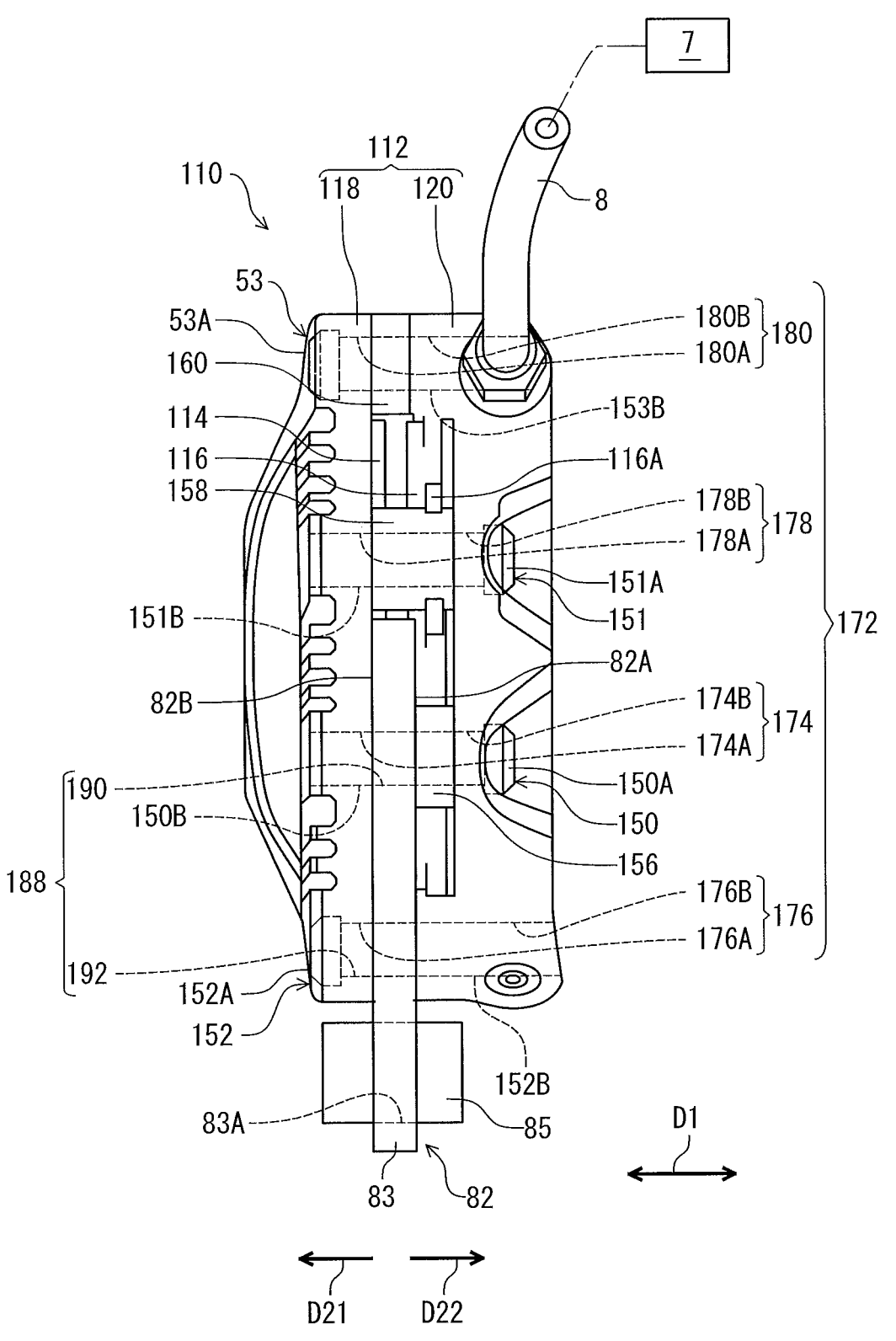
FIG. 27 is a plan view of the second disc brake caliper illustrated in FIG. 26.
Figure 28:
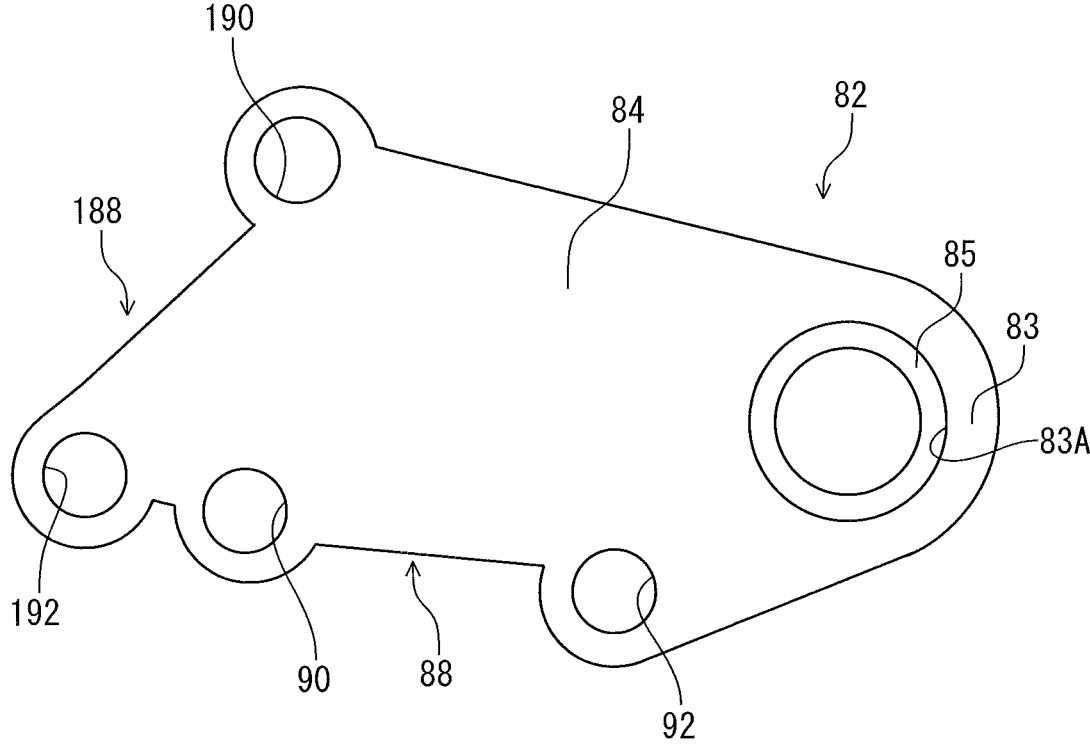
FIG. 28 is a side elevational view of a caliper adaptor of the first disc brake caliper illustrated in FIG. 25.

In the modification depicted in FIGS. 17 to 19, the first surface 82A faces in the first direction D21 in each of the first coupling state (see e.g., FIG. 5) and the second coupling state (sec e.g., FIG. 12). As seen in FIGS. 25 to 28, however, the first surface 82A of the caliper adaptor 82 can be arranged to face in the second direction D22 in the second coupling state if needed and/or desired. As seen in FIG. 27, the first surface 82A faces in the second direction D22 in the second coupling state where the frame coupling portion 83 is coupled to the protruding portion 3B and where the second coupling portion 188 is coupled to the second caliper body 112. As seen in FIG. 28, the second hole 190 is spaced apart from the first hole 90. The structure of the caliper adaptor 82 depicted in FIGS. 25 to 28 can be applied to the caliper adaptor 383 of the second embodiment if needed and/or desired.

In the first and second embodiments and the modifications thereof, the first caliper body 12, the second caliper body 112, and the third caliper body 212 are different caliper bodies. However, the first caliper body 12 can be the same caliper body as at least one of the second caliper body 112 and the third caliper body 212 if needed and/or desired. The caliper adaptor 82 can be configured to couple the caliper body 12 and the vehicle body 3 in different radial positions (e.g., the first radial position P1, the second radial position P2, and the third radial position P3) with respect to the rotational axis RA. In such modifications, for example, the axle mounting bracket 62 is a separate member from the caliper body 12 and is configured to adjust the position of the caliper body 12 to each of the first radial position P1, the second radial position P2, and the third radial position P3. Furthermore, the axle mounting bracket 62 can be omitted from the disc brake caliper 10 if needed and/or desired. In such modifications, the caliper body 12 is coupled to the vehicle body 3 via the caliper adaptor 82 and another member. The caliper adaptor 82 can have a structure configured to fixedly couple the caliper body 12 and the vehicle body 3 without the axle mounting bracket 62. The above modifications can be applied to the modifications of the first embodiment or the second embodiment and the modifications thereof.

In the first and second embodiments and the modifications thereof, the caliper adaptor 82 is configured to couple the mounting portion 3A of the vehicle body 3 and each of the first caliper body 12, the second caliper body 112, and the third caliper body 212. However, the caliper adaptor 82 is configured to couple different vehicle bodies and at least one of the first caliper body 12, the second caliper body 112, and the third caliper body 212 if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teach-ings. It is therefore to be understood that within the scope of the appended claims, the invention may be practiced other-wise than as specifically described herein.

What is claimed is:

1. A caliper adaptor comprising:
a frame coupling portion configured to be mounted to a mounting portion of a vehicle body of a human-powered vehicle, the frame coupling portion extending in an axial direction in a coupling state where the mounting portion is mounted to the frame coupling portion, the axial direction being defined along a rota-tional axis of a disc brake rotor rotatably coupled to the vehicle body;
a first coupling portion configured to be coupled to a first caliper body of at least one disc brake caliper of the human-powered vehicle in a first state where the first caliper body is in a first radial position relative to the rotational axis, the first coupling portion extending in the axial direction in the first state; and
a second coupling portion configured to be coupled to a second caliper body of the at least one disc brake caliper in a second state where the second caliper body is in a second radial position relative to the rotational axis, the second radial position being different from the first radial position, the second coupling portion extending in the axial direction in the second state.

2. The caliper adaptor according to claim 1, wherein
the first coupling portion includes a first hole extending in the axial direction in the first state, and
the first coupling portion is configured to be coupled to the first caliper body in the first state via the first hole.

3. The caliper adaptor according to claim 2, wherein
the second coupling portion includes a second hole extending in the axial direction in the second state, and
the second coupling portion is configured to be coupled to the second caliper body in the second state via the second hole.

4. The caliper adaptor according to claim 3, wherein
the first coupling portion includes a first additional hole extending in the axial direction in the first state, the first additional hole being spaced apart from the first hole, and
the first coupling portion is configured to be coupled to the first caliper body in the first state via the first hole and the first additional hole.

5. The caliper adaptor according to claim 4, wherein
the second coupling portion includes a second additional hole extending in the axial direction in the second state, the second additional hole being spaced apart from the second hole, and
the second coupling portion is configured to be coupled to the second caliper body in the second state via the second hole and the second additional hole.

6. The caliper adaptor according to claim 5, wherein
the first hole has a first center axis,
the first additional hole has a first additional center axis,
the second hole has a second center axis,
the second additional hole has a second additional center axis,
a first distance is defined between the first center axis and the first additional center axis as viewed along the first center axis, a second distance is defined between the second center axis and the second additional center axis as viewed along the second center axis, and
the first distance is equal to the second distance.

7. The caliper adaptor according to claim 6, wherein
the frame coupling portion includes a frame coupling hole having a frame-coupling center axis,
a first additional distance is defined between the first center axis and the frame-coupling center axis,
a second additional distance is defined between the sec-ond center axis and the frame-coupling center axis, and
the first additional distance is equal to the second addi-tional distance.

8. The caliper adaptor according to claim 7, wherein
the second distance is shorter than the second additional distance.

9. The caliper adaptor according to claim 8, wherein
the third coupling portion is provided radially outwardly of the frame coupling portion in a third coupling state where the frame coupling portion is coupled to the protruding portion and where the third coupling portion is coupled to the third caliper body.

10. The caliper adaptor according to claim 7, wherein
the first distance is shorter than the first additional dis-tance.

11. The caliper adaptor according to claim 3, wherein
the first hole and the second hole constitute a single hole.

12. A disc brake caliper for a human-powered vehicle, comprising:
the caliper adaptor according to claim 1;
the first caliper body including a first body part and a second body part;
a first brake pad coupled to the first body part; and
a second brake pad movable relative to the second body part.

13. The disc brake caliper according to claim 12, wherein
the first caliper body includes a first caliper coupling portion having a first pattern,
the second caliper body includes a second caliper cou-pling portion having a second pattern, the first pattern being identical to the second pattern,
the first coupling portion of the caliper adaptor is config-ured to be coupled to the first caliper coupling portion in the first state, and
the second coupling portion of the caliper adaptor is configured to be coupled to the second caliper coupling portion in the second state.

14. The disc brake caliper according to claim 13, wherein
the first caliper coupling portion includes a first caliper coupling hole and a second caliper coupling hole, the first caliper coupling hole and the second caliper cou-pling hole defining the first pattern,
the second caliper coupling portion includes a third cali-per coupling hole and a fourth caliper coupling hole, the third caliper coupling hole and the fourth caliper coupling hole defining the second pattern,
the first coupling portion of the caliper adaptor is config-ured to be coupled to the first caliper coupling hole and the second caliper coupling hole in the first state, and
the second coupling portion of the caliper adaptor is configured to be coupled to the third caliper coupling hole and the fourth caliper coupling hole in the second state.

15. The disc brake caliper according to claim 12, further comprising a piston, wherein the first caliper body includes a cylinder hole, and the piston is movably provided in the cylinder hole.

16. The disc brake caliper according to claim 15, further comprising a magnetic body coupled to the piston.

17. The disc brake caliper according to claim 12, further comprising an axle mounting bracket configured to couple the first caliper body and a hub axle of a hub assembly of the human-powered vehicle.

18. The disc brake caliper according to claim 17, wherein the axle mounting bracket is integrally provided with the first body part as a one-piece unitary member.

19. The disc brake caliper according to claim 12, wherein the caliper adaptor is at least partially provided between the first body part and the second body part.

20. The caliper adaptor according to claim 1, further comprising a third coupling portion configured to be coupled to a third caliper body in a third state where the third caliper body is in a third radial position relative to the rotational axis, the third radial position being different from each of the first radial position and the second radial position.

21. The caliper adaptor according to claim 20, wherein the first coupling portion includes a first hole extending in the axial direction in the first state, the first coupling portion is configured to be coupled to the first caliper body in the first state via the first hole, the second coupling portion includes a second hole extending in the axial direction in the second state, the second coupling portion is configured to be coupled to the second caliper body in the second state via the second hole, the third coupling portion includes a third hole extending in the axial direction in the third state, and the third coupling portion is configured to be coupled to the third caliper body in the third state via the third hole.

22. The caliper adaptor according to claim 21, wherein the third coupling portion includes a third additional hole extending in the axial direction in the third state, the third additional hole being spaced apart from the third hole, and the third coupling portion is configured to be coupled to the third caliper body in the third state via the third hole and the third additional hole.

23. The caliper adaptor according to claim 22, wherein the frame coupling portion includes a frame coupling hole having a frame-coupling center axis, the first hole has a first center axis, the first additional hole has a first additional center axis, the second hole has a second center axis, the second additional hole has a second additional center axis, the third hole has a third center axis, the third additional hole has a third additional center axis, a first distance is defined between the first center axis and the first additional center axis as viewed along the first center axis, a second distance is defined between the second center axis and the second additional center axis as viewed along the second center axis, a third distance is defined between the third center axis and the third additional center axis, and the third distance is equal to at least one of the first distance and the second distance.

24. The caliper adaptor according to claim 21, wherein the second coupling portion includes a second additional hole extending in the axial direction in the second state, the second additional hole being spaced apart from the second hole, the second coupling portion is configured to be coupled to the second caliper body in the second state via the second hole and the second additional hole, and the second additional hole and the third hole constitute a single hole.

25. The caliper adaptor according to claim 1, further comprising:

a first surface; and a third coupling portion configured to be coupled to a third caliper body in a third state where the third caliper body is in a third radial position relative to the rotational axis, the third radial position being different from each of the first radial position and the second radial position, wherein the first surface faces in a first direction in a first coupling state where the frame coupling portion is coupled to the protruding portion and where the first coupling portion is coupled to the first caliper body, the first surface faces in one of the first direction and a second direction in a second coupling state where the frame coupling portion is coupled to the protruding portion and where the second coupling portion is coupled to the second caliper body, the second direction being an opposite direction of the first direction, and the first surface faces in one of the first direction and the second direction in a third coupling state where the frame coupling portion is coupled to the protruding portion and where the third coupling portion is coupled to the third caliper body.

26. The caliper adaptor according to claim 25, wherein the first surface faces in the first direction in the second coupling state, and the first surface faces in the second direction in the third coupling state.

27. The caliper adaptor according to claim 1, further comprising a sleeve provided in the frame coupling hole, wherein the sleeve is made of a non-metallic material.

28. The caliper adaptor according to claim 27, wherein the sleeve is made of a resin material.

29. The caliper adaptor according to claim 1, wherein the frame coupling portion includes a frame coupling hole in which a protruding portion of the mounting portion is to be at least partially provided, the frame coupling hole extending in the axial direction in a coupling state where the protruding portion is at least partially provided in the frame coupling hole.

30. The caliper adaptor according to claim 1, further comprising:

a first surface, wherein the first surface faces in a first direction in a first coupling state where the frame coupling portion is coupled to the protruding portion and where the first coupling portion is coupled to the first caliper body, and the first surface faces in a second direction in a second coupling state where the frame coupling portion is coupled to the protruding portion and where the second coupling portion is coupled to the second caliper body, the second direction being an opposite direction of the first direction.

\* \* \* \* \*